United States Patent
Kumar et al.

(10) Patent No.: US 11,606,794 B2
(45) Date of Patent: Mar. 14, 2023

(54) TECHNIQUES FOR TRANSMIT POWER ALLOCATION IN DUAL CONNECTIVITY

(71) Applicant: QUALCOMM Incorporated, San Diego, CA (US)

(72) Inventors: Akshay Kumar, San Diego, CA (US); Arnaud Meylan, San Diego, CA (US); Reza Shahidi, San Diego, CA (US); Baojun Lu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 17/320,602

(22) Filed: May 14, 2021

(65) Prior Publication Data

US 2022/0369319 A1     Nov. 17, 2022

(51) Int. Cl.
*H04W 72/04*     (2009.01)
*H04W 72/044*    (2023.01)
*H04W 52/38*     (2009.01)
*H04W 76/15*     (2018.01)

(52) U.S. Cl.
CPC ....... *H04W 72/0473* (2013.01); *H04W 52/38* (2013.01); *H04W 76/15* (2018.02)

(58) Field of Classification Search
None
See application file for complete search history.

(56) References Cited

U.S. PATENT DOCUMENTS 11,064,442 B1 * 7/2021 Marupaduga ....... H04W 52/146

FOREIGN PATENT DOCUMENTS

WO  WO-2017054836 A1 *  4/2017 .......... H04W 52/146
WO  WO-2021030970 A1     2/2021

OTHER PUBLICATIONS

Partial International Search Report—PCT/US2022/071741—ISA/EPO—dated Jul. 26, 2022.
International Search Report and Written Opinion—PCT/US2022/071741—ISA/EPO—dated Sep. 16, 2022.

* cited by examiner

*Primary Examiner* — Kouroush Mohebbi
(74) *Attorney, Agent, or Firm* — Dalei Dong; Holland & Hart LLP

(57) ABSTRACT

Methods, systems, and devices for wireless communications are described. A user equipment (UE) may establish a first wireless connection with a first wireless device, and a second wireless connection with the first wireless device or a second wireless device, where the first wireless connection and the second wireless connection operate in a dual connectivity mode. The UE may identify first and second energy efficiency metrics associated with the first and second wireless connections, respectively. The UE may identify one or more parameters associated with a transmit power of communications at the UE, and may compare the first energy efficiency metric and the second energy efficiency metric. The UE may then allocate a first power resource to the first wireless connection, a second power resource to the second wireless connection, or both, based on the comparison, the one or more parameters, or a combination thereof.

24 Claims, 17 Drawing Sheets

TECHNIQUES FOR TRANSMIT POWER ALLOCATION IN DUAL CONNECTIVITY

FIELD OF TECHNOLOGY

The following relates to wireless communications, including techniques for transmit power allocation in dual connectivity.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

To limit radiation exposure to human tissue, UEs must comply with various constraints set by regulatory agencies. For example, Specific Absorption Rate (SAR) and Maximum Permissible Exposure (MPE) are regulatory constraints on the transmit power of signals transmitted by a UE for sub-6/LTE communications and millimeter wave (mmW) communications, respectively. However, maintaining compliance with regulatory constraints such as SAR and MPE may be much more difficult in the context of dual connectivity.

SUMMARY

The described techniques relate to improved methods, systems, devices, and apparatuses that support techniques for transmit power allocation (e.g., power resource allocation) in dual connectivity. In particular, aspects of the present disclosure support techniques for dynamically allocating transmit power across multiple wireless connections at a user equipment (UE) based on a relative energy efficiency (e.g., energy/byte, energy/bit) of each of the wireless connections. For example, a UE operating in a dual connectivity mode may communicate via a first wireless connection and a second wireless connection. In this example, the UE may allocate transmit powers to each of the wireless connections based on a comparison of an energy efficiency associated with each of the wireless connections. For instance, if the first wireless connection exhibits a higher energy efficiency (e.g., more energy efficient), the UE may allocate a higher transmit power to the first wireless communication in order to increase an uplink throughput at the UE while maintaining compliance with relevant regulatory constraints.

A method for wireless communication at a UE is described. The method may include establishing a first wireless connection with a first wireless device, establishing a second wireless connection with the first wireless device or a second wireless device, where the first wireless connection and the second wireless connection operate in a dual connectivity mode, identifying a first energy efficiency metric associated with the first wireless connection and a second energy efficiency metric associated with the second wireless connection, identifying one or more parameters associated with a transmit power of communications at the UE, comparing the first energy efficiency metric and the second energy efficiency metric, and allocating a first power resource to the first wireless connection, a second power resource to the second wireless connection, or both, based on the comparison, the one or more parameters, or a combination thereof.

An apparatus for wireless communication at a UE is described. The apparatus may include a processor, memory coupled with the processor, and instructions stored in the memory. The instructions may be executable by the processor to cause the apparatus to establish a first wireless connection with a first wireless device, establish a second wireless connection with the first wireless device or a second wireless device, where the first wireless connection and the second wireless connection operate in a dual connectivity mode, identify a first energy efficiency metric associated with the first wireless connection and a second energy efficiency metric associated with the second wireless connection, identify one or more parameters associated with a transmit power of communications at the UE, compare the first energy efficiency metric and the second energy efficiency metric, and allocate a first power resource to the first wireless connection, a second power resource to the second wireless connection, or both, based on the comparison, the one or more parameters, or a combination thereof.

Another apparatus for wireless communication at a UE is described. The apparatus may include means for establishing a first wireless connection with a first wireless device, means for establishing a second wireless connection with the first wireless device or a second wireless device, where the first wireless connection and the second wireless connection operate in a dual connectivity mode, means for identifying a first energy efficiency metric associated with the first wireless connection and a second energy efficiency metric associated with the second wireless connection, means for identifying one or more parameters associated with a transmit power of communications at the UE, means for comparing the first energy efficiency metric and the second energy efficiency metric, and means for allocating a first power resource to the first wireless connection, a second power resource to the second wireless connection, or both, based on the comparison, the one or more parameters, or a combination thereof.

A non-transitory computer-readable medium storing code for wireless communication at a UE is described. The code may include instructions executable by a processor to establish a first wireless connection with a first wireless device, establish a second wireless connection with the first wireless device or a second wireless device, where the first wireless connection and the second wireless connection operate in a dual connectivity mode, identify a first energy efficiency metric associated with the first wireless connection and a second energy efficiency metric associated with the second wireless connection, identify one or more parameters associated with a transmit power of communications at the UE, compare the first energy efficiency metric and the second energy efficiency metric, and allocate a first power resource to the first wireless connection, a second power resource to the second wireless connection, or both, based on the comparison, the one or more parameters, or a combination thereof.

Some examples of the method, apparatuses, and non-transitory computer-readable medium described herein may further include operations, features, means, or instructions for transmitting a first message to the first wireless device via the first wireless connection based on the first power resource and transmitting a second message to the first wireless device or the second wireless device via the second wireless connection based on the second power resource.

Some examples of the method, apparatuses, and non-transitory computer-readable medium described herein may further include operations, features, means, or instructions for transmitting a control message indicating a first set of one or more characteristics associated with wireless communications at the UE based on the first power resource, the second power resource, or a combination thereof.

Some examples of the method, apparatuses, and non-transitory computer-readable medium described herein may further include operations, features, means, or instructions for identifying an available power headroom (PHR), a message buffer queue, or both, associated with the UE based on the first power resource, the second power resource, the one or more parameters, or any combination thereof and selectively adjusting at least one of the available PHR or the message buffer queue to generate an adjusted available PHR, an adjusted message buffer queue, or both, where the first set of one or more characteristics include the adjusted available PHR, the adjusted message buffer queue, or both.

Some examples of the method, apparatuses, and non-transitory computer-readable medium described herein may further include operations, features, means, or instructions for transmitting, via the control message, an indication of a first message buffer queue associated with the first wireless connection and a second message buffer queue associated with the second wireless connection, the second message buffer queue different from the first message buffer queue.

In some examples of the method, apparatuses, and non-transitory computer-readable medium described herein, the larger of the first message buffer queue and the second message buffer queue may be associated with a wireless connection from the first wireless connection and the second wireless connection which may be associated with the higher energy efficiency metric of the first energy efficiency metric and the second energy efficiency metric.

In some examples of the method, apparatuses, and non-transitory computer-readable medium described herein, allocating the first power resource and the second power resource may include operations, features, means, or instructions for allocating the first power resource and the second power resource based on an aggregate data throughput associated with the first wireless connection and the second wireless connection satisfying a threshold data throughput.

In some examples of the method, apparatuses, and non-transitory computer-readable medium described herein, allocating the first power resource and the second power resource may include operations, features, means, or instructions for allocating the first power resource and the second power resource based on an absence of voice traffic at the UE, or whether voice traffic at the UE may be communicated via the first wireless connection, the second wireless connection, or a combination thereof.

In some examples of the method, apparatuses, and non-transitory computer-readable medium described herein, allocating the first power resource and the second power resource may include operations, features, means, or instruc-
tions for allocating the first power resource and the second power resource based on whether the first wireless connection may be associated with a default radio bearer.

In some examples of the method, apparatuses, and non-transitory computer-readable medium described herein, allocating the first power resource and the second power resource may include operations, features, means, or instructions for allocating the first power resource and the second power resource may be based on whether internet traffic at the UE may be communicated via the first wireless connection, the second wireless connection, or both.

In some examples of the method, apparatuses, and non-transitory computer-readable medium described herein, allocating the first power resource and the second power resource may include operations, features, means, or instructions for allocating the first power resource and the second power resource may be based on a configuration of a first data radio bearer (DRB) associated with the first wireless connection, a second DRB associated with the second wireless connection, or both.

In some examples of the method, apparatuses, and non-transitory computer-readable medium described herein, the configuration of the first DRB, the second DRB, or both, includes a split radio bearer configuration, a non-split radio bearer configuration, or both.

Some examples of the method, apparatuses, and non-transitory computer-readable medium described herein may further include operations, features, means, or instructions for identifying a first modulation and coding scheme (MCS) associated with the first wireless connection and a second MCS associated with the second wireless connection, where identifying the first energy efficiency metric and the second energy efficiency metric may be based on the first MCS, the second MCS, or a combination thereof.

Some examples of the method, apparatuses, and non-transitory computer-readable medium described herein may further include operations, features, means, or instructions for performing a first set of measurements on a first message received via the first wireless connection and performing a second set of measurements on a second message received via the second wireless connection, where identifying the first energy efficiency metric and the second energy efficiency metric may be based on the first set of measurements, the second set of measurements, or a combination thereof.

Some examples of the method, apparatuses, and non-transitory computer-readable medium described herein may further include operations, features, means, or instructions for receiving a first measurement report associated with communications performed via the first wireless connection and receiving a second measurement report associated with communications performed via the second wireless connection, where identifying the first energy efficiency metric and the second energy efficiency metric may be based on the first measurement report, the second measurement report, or a combination thereof.

In some examples of the method, apparatuses, and non-transitory computer-readable medium described herein, the one or more parameters include a specific absorption rate (SAR), a maximum permissible exposure (MPE), or both.

In some examples of the method, apparatuses, and non-transitory computer-readable medium described herein, the first wireless connection includes a wireless connection for a master cell group (MCG), and the second wireless connection includes a wireless connection for a secondary cell group (SCG).

In some examples of the method, apparatuses, and non-transitory computer-readable medium described herein, the first wireless connection and the second wireless connection may be associated with a same radio access technology and the first wireless connection may be associated with a first radio access technology, and the second wireless connection may be associated with a second radio access technology different from the first radio access technology.

In some examples of the method, apparatuses, and non-transitory computer-readable medium described herein, allocating the first transmit power and the second transmit power may include operations, features, means, or instructions for allocating the first power resource based on a first minimum power resource threshold and a first maximum power resource threshold associated with the first wireless connection and allocating the second power resource based on a second minimum power resource threshold and a second maximum power resource threshold associated with the second wireless connection.

In some examples of the method, apparatuses, and non-transitory computer-readable medium described herein, the first power resource, the second power resource, or both, includes an instantaneous transmit power, a transmit power over a time interval, or both.

A method for wireless communication at a base station is described. The method may include establishing a first wireless connection with a UE based on the UE operating in accordance with a dual connectivity mode, receiving, from the UE via the first wireless connection, a control message indicating a set of one or more characteristics associated with wireless communications at the UE based on a first power resource allocated to the first wireless connection at the UE, a second power resource allocated to a second wireless connection at the UE, or a combination thereof, and transmitting, to the UE via the first wireless connection, a grant scheduling one or more messages to be transmitted by the UE via the first wireless connection, the second wireless connection, or both, where the grant is based on the set of one or more characteristics.

An apparatus for wireless communication at a base station is described. The apparatus may include a processor, memory coupled with the processor, and instructions stored in the memory. The instructions may be executable by the processor to cause the apparatus to establish a first wireless connection with a UE based on the UE operating in accordance with a dual connectivity mode, receive, from the UE via the first wireless connection, a control message indicating a set of one or more characteristics associated with wireless communications at the UE based on a first power resource allocated to the first wireless connection at the UE, a second power resource allocated to a second wireless connection at the UE, or a combination thereof, and transmit, to the UE via the first wireless connection, a grant scheduling one or more messages to be transmitted by the UE via the first wireless connection, the second wireless connection, or both, where the grant is based on the set of one or more characteristics.

Another apparatus for wireless communication at a base station is described. The apparatus may include means for establishing a first wireless connection with a UE based on the UE operating in accordance with a dual connectivity mode, means for receiving, from the UE via the first wireless connection, a control message indicating a set of one or more characteristics associated with wireless communications at the UE based on a first power resource allocated to the first wireless connection at the UE, a second power resource allocated to a second wireless connection at the UE, or a combination thereof, and means for transmitting, to the UE via the first wireless connection, a grant scheduling one or more messages to be transmitted by the UE via the first wireless connection, the second wireless connection, or both, where the grant is based on the set of one or more characteristics.

A non-transitory computer-readable medium storing code for wireless communication at a base station is described. The code may include instructions executable by a processor to establish a first wireless connection with a UE based on the UE operating in accordance with a dual connectivity mode, receive, from the UE via the first wireless connection, a control message indicating a set of one or more characteristics associated with wireless communications at the UE based on a first power resource allocated to the first wireless connection at the UE, a second power resource allocated to a second wireless connection at the UE, or a combination thereof, and transmit, to the UE via the first wireless connection, a grant scheduling one or more messages to be transmitted by the UE via the first wireless connection, the second wireless connection, or both, where the grant is based on the set of one or more characteristics.

Some examples of the method, apparatuses, and non-transitory computer-readable medium described herein may further include operations, features, means, or instructions for establishing the second wireless connection with the UE, where the first wireless connection and the second wireless connection operate in the dual connectivity mode at the UE, receiving, a first message from the UE via the first wireless connection based on the grant and the first power resource, and receiving a second message from the UE via the second wireless connection based on the grant and the second power resource.

DETAILED DESCRIPTION

Figure 1:
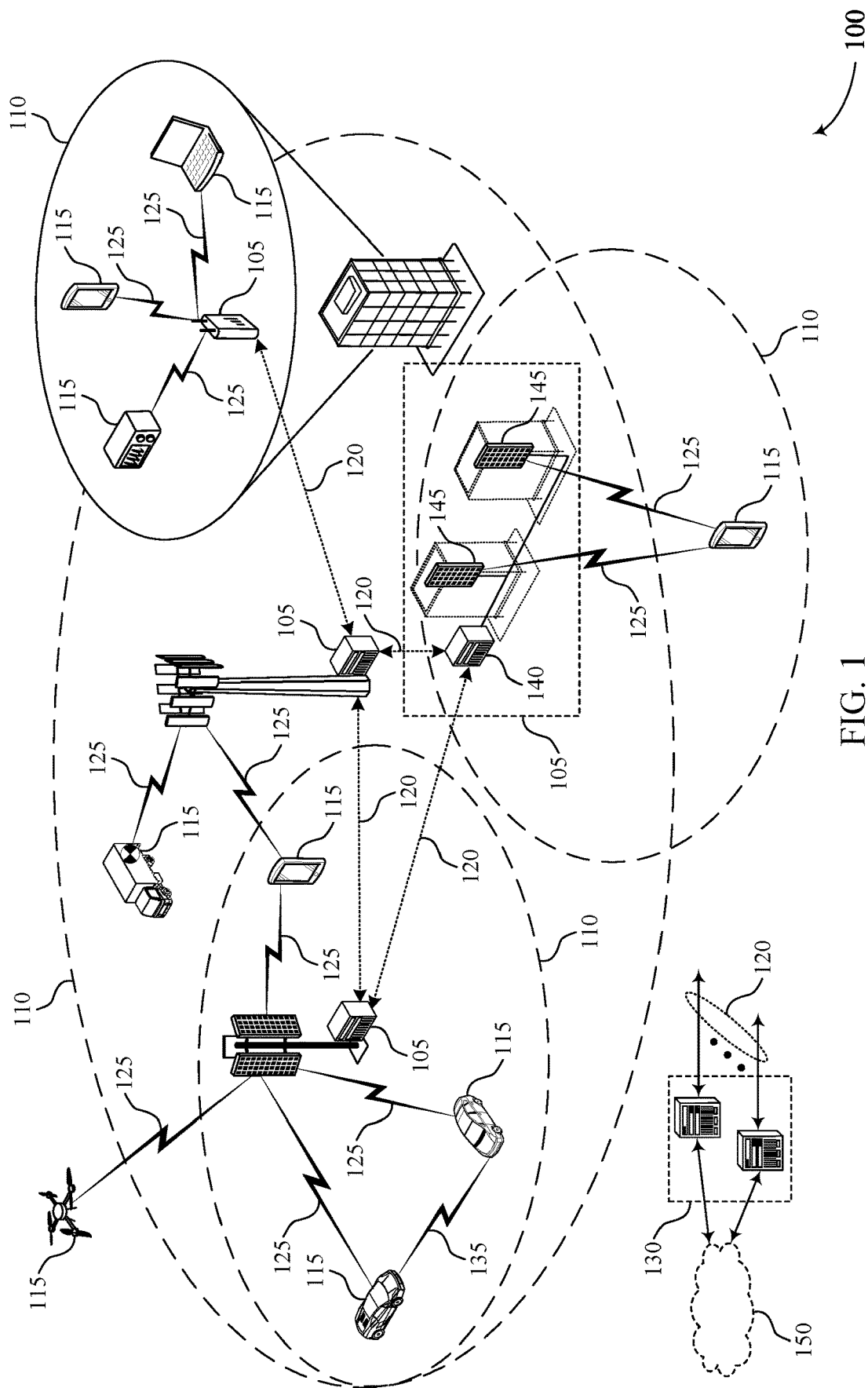
FIG. 1 illustrates an example of a wireless communications system that supports techniques for transmit power allocation in dual connectivity in accordance with aspects of the present disclosure.

To limit radiation exposure to human tissue, some wireless devices (e.g., user equipments (UEs)) must comply with various constraints set by regulatory agencies, such as the Federal Communications Commission. For example, Specific Absorption Rate (SAR) and Maximum Permissible Exposure (MPE) are regulatory constraints on the transmit power of signals transmitted by a UE for sub-6/Long Term Evolution (LTE) communications and millimeter wave (mmW) communications, respectively. To remain compliant with these constraints, UEs must monitor time averaged transmit powers (moving time averaged) for uplink communications, and adjust transmit powers to remain compliant.

However, maintaining compliance with regulatory constraints such as SAR and MPE is much more difficult in the context of dual connectivity. In such cases, the UE may communicate via multiple wireless connections (e.g., links), where the total transmit power across the UE is split up between the respective wireless connections. Some techniques for maintaining transmit power compliance include allocating transmit power across the multiple wireless connections based on which wireless connection includes voice traffic. These conventional techniques, however, may reduce an uplink throughput at the UE when the link including the voice traffic is energy inefficient (e.g., requires large quantities of energy/byte).

Accordingly, aspects of the present disclosure support techniques for dynamically allocating transmit power (e.g., power resource) across multiple wireless connections at a UE based on a relative energy efficiency (e.g., energy/byte, energy/bit) of each of the wireless connections. For example, a UE operating in a dual connectivity mode may communicate via a first wireless connection and a second wireless connection. In this example, the UE may allocate transmit powers to each of the wireless connections based on a comparison of an energy efficiency associated with each of the wireless connections. For instance, if the first wireless connection exhibits a higher energy efficiency (e.g., more energy efficient), the UE may allocate a higher transmit power to the first wireless communication in order to increase an uplink throughput at the UE while maintaining compliance with relevant regulatory constraints (e.g., SAR, MPE).

In some implementations, the UE may report the determined transmit power allocation to ensure that base stations do not schedule uplink communications at the UE which would cause the UE to exceed the transmit powers (and perhaps become non-compliant with the relevant constraints). For example, the UE may report "fake" (e.g., artificially adjusted) power headroom (PHR) and/or buffer status report (BSR) values to limit uplink grants from a base station. In some aspects, the UE may also consider other parameters in addition to energy efficiency when allocating the transmit powers across the wireless connections. Additional parameters which may be considered when allocating transmit powers to wireless connections may include an existence (or lack thereof) of voice traffic and/or internet traffic on one of the wireless connections, whether the relevant bearers are split or non-split (e.g., whether traffic on the respective bearers may be split across multiple bearers or not), and the like.

Aspects of the disclosure are initially described in the context of wireless communications systems. Additional aspects of the disclosure are described in the context of an example process flow and example flowcharts. Aspects of the disclosure are further illustrated by and described with reference to apparatus diagrams, system diagrams, and flowcharts that relate to techniques for transmit power allocation in dual connectivity.

FIG. 1 illustrates an example of a wireless communications system 100 that supports techniques for transmit power allocation in dual connectivity in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (RAT) (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As noted previously herein, some wireless devices (e.g., UEs) must comply with various constraints set by regulatory agencies, such as SAR (relevant for sub6 and LTE communications) and MPE (relevant for mmW communications). However, maintaining compliance with regulatory constraints such as SAR and MPE is much more difficult in the context of dual connectivity. In such cases, the UE may communicate via multiple wireless connections (e.g., links, legs), where the total transmit power (e.g., power resource) across the UE is split up between the respective wireless connections in an attempt to maximize data throughput while sustaining non-throttleable traffic (e.g., traffic which requires a minimum data throughput) on the respective wireless connections. Moreover, in the context of dual connectivity, each wireless connection (e.g., each leg) may potentially have a different link power budget due to the different frequency bands, and the varying distances between the UE 115 and the base station 105 for the respective wireless connections. Further, the maximum achievable capacity for a given transmit power may be different for each wireless connection due to different configured bandwidths and the maximum supported uplink modulation and coding scheme (MCS) for the respective wireless connections.

To remain compliant with applicable regulatory constraints, some techniques may be configured to reduce (e.g., switch down) an MCS for uplink communications to remain compliant with regulatory constraints, but doing so may result in a loss of uplink throughput. Moreover, reducing an MCS for uplink communications may limit downlink coverage if the system is unable to sustain signaling radio bearers (SRBs) and control traffic, and may make it difficult to maintain guaranteed-bit-rate applications such as voice over internet protocol (VoIP) communications.

Other techniques for maintaining transmit power compliance include allocating transmit power to transmitters (e.g., wireless connections) with higher transmit priority requiring less power backoff. In particular, some techniques may attempt to maintain transmit power compliance by allocating transmit across the multiple wireless connections based on which wireless connection includes voice traffic. For example, the wireless connection carrying voice traffic (e.g., VoLTE, VoNR) may be designated as a "primary" wireless connection. Subsequently, antenna components associated with the primary wireless connection may be allocated whatever power they require, and antenna components associated with "secondary" wireless connections may be allocated any remaining transmit power (e.g., allocate min (remaining power, 50% reserve), where "reserve" is 50% of the total transmit power set aside for possible future communications over the primary wireless connection. In some cases, techniques may allocate a static percent of total transmit power for the secondary wireless link.

These conventional techniques, however, may reduce an uplink throughput at the UE when the link including the voice traffic is energy inefficient (e.g., requires large quantities of energy/byte). For example, voice traffic is typically communicated over an LTE link, while NR links typically exhibit higher capacity and throughput for internet and other traffic. As such, by allocating power according to the presence of voice traffic, some techniques may protect voice traffic on the LTE link, but may result in a loss of uplink throughput for internet traffic on an NR link, as a majority of the transmit power is allocated to the LTE link.

Accordingly, aspects of the present disclosure support techniques for dynamically allocating transmit power across multiple wireless connections at a UE based on a relative energy efficiency (e.g., energy/byte, energy/bit) of each of the wireless connections. By allocating transmit power according to a relative energy efficiency of the respective wireless connections, techniques described herein may improve/maximize throughput for data traffic (e.g., internet traffic) at a UE 115 by intelligently splitting power between uplink paths based on link budgets and other parameters of the respective paths.

For example, a UE operating in a dual connectivity mode may communicate via a first wireless connection and a second wireless connection. In this example, the UE may allocate transmit powers to each of the wireless connections based on a comparison of an energy efficiency associated with each of the wireless connections. For instance, if the first wireless connection exhibits a higher energy efficiency (e.g., more energy efficient), the UE may allocate a higher transmit power to the first wireless communication in order to increase an uplink throughput at the UE while maintaining compliance with relevant regulatory constraints (e.g., SAR, MPE).

In some implementations, the UE may report the determined transmit power allocation to ensure that base stations do not schedule uplink communications at the UE which would cause the UE to exceed the transmit powers (and perhaps become non-compliant with the relevant constraints). For example, the UE may report "fake" (e.g., artificially adjusted) power headroom (PHR) and/or buffer status report (BSR) values to limit uplink grants from a base station. In some aspects, the UE may also consider other parameters in addition to energy efficiency when allocating the transmit powers across the wireless connections. Additional parameters which may be considered when allocating transmit powers to wireless connections may include an existence (or lack thereof) of voice traffic and/or internet traffic on one of the wireless connections, whether the relevant bearers are split or non-split (e.g., whether traffic on the respective bearers may be split across multiple bearers or not), and the like.

Techniques described herein may enable for UEs 115 and other wireless devices to maintain compliance with applicable regulatory constraints (e.g., SAR, MPE) in the context of dual connectivity. In particular, by allocating transmit power across wireless connections based on a relative energy efficiency of the respective wireless connections, techniques described herein may enable a UE 115 to increase (e.g., maximize) data throughput at the UE 115 across the respective wireless connections while sustaining non-throttleable traffic and ensuring compliance with applicable regulatory constraints. Accordingly, aspects of the present disclosure may improve data throughput within the wireless communications system 100, limit radiation exposure to human tissue, and increase the effectiveness and widespread use of dual connectivity.

Figure 2:
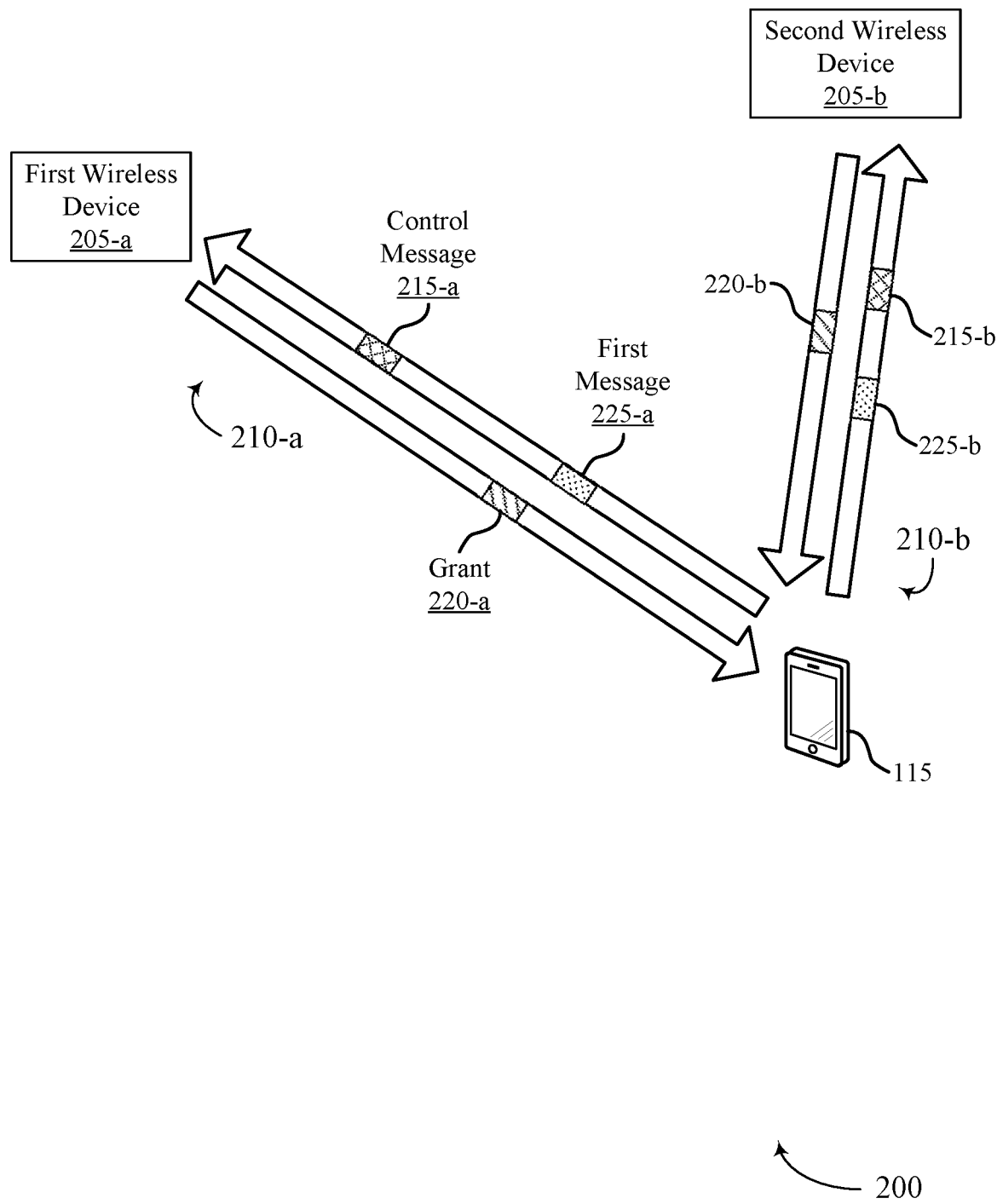
FIG. 2 illustrates an example of a wireless communications system that supports techniques for transmit power allocation in dual connectivity in accordance with aspects of the present disclosure.

FIG. 2 illustrates an example of a wireless communications system 200 that supports techniques for transmit power allocation in dual connectivity in accordance with aspects of the present disclosure. The wireless communications system 200 may implement, or be implemented by, aspects of wireless communication system 100.

The wireless communications system 200 may include a UE 115, a first wireless device 205-*a*, and a second wireless device 205-*b*, which may be examples of UEs 115, base stations 105, and other wireless devices (e.g., IAB nodes, augmented reality (AR) glasses, virtual reality (VR) glasses), as described with reference to FIG. 1. For example, in some cases, the first wireless device 205-*a* and the second wireless device 205-*b* may include a first base station 105 and a second base station 105, respectively.

In some aspects, the UE 115 may communicate with the first wireless device 205-*a* and the second wireless device 205-*b* using one or more beams, one or more carriers, one or more communications links, or any combination thereof. For example, the UE 115 may communicate with the first wireless device 205-*a* and the second wireless device 205-*b* using a first communication link 210-*a* and a second communication link 210-*b*, respectively. In some cases, the communication link 210-*a* and the communication link 210-*b* may include examples of access links (e.g., a Uu links). The communication link 210-*a* and communication link 210-*b* may include bi-directional links that can include both uplink and downlink communication. For example, the UE 115 may transmit uplink transmissions, such as uplink control signals or uplink data signals, to the first wireless device 205-*a* using the communication link 210-*a*, and the first wireless device 205-*a* may transmit downlink transmissions, such as downlink control signals or downlink data signals, to the UE 115 using the communication link 210-*a*.

In some implementations, the UE 115 may be configured to operate in a dual connectivity mode. That is, the UE 115 may be configured to simultaneously communicate over two or more wireless connections. The two or more wireless connections at the UE 115 may be associated with the same radio access technology, different radio access technologies, or both. For example, the UE 115 may be configured to operate in a dual connectivity mode in which the UE 115 communicates over an LTE wireless connection and an NR wireless connection. By way of another example, the UE 115 may be configured to operate in a dual connectivity mode in which the UE 115 communicates over a first LTE wireless connection and a second LTE wireless connection. Moreover, the respective wireless connections of the dual connectivity mode at the UE 115 may be associated with different frequency ranges (e.g., first wireless connection using FR1, second wireless connection using FR2), different component carriers (e.g., first wireless connection using a primary component carrier (PCC), second wireless connection using a secondary component carrier (SCC)), and the like.

While operating within a dual connectivity mode, the UE 115 may be configured to establish multiple wireless connections with multiple wireless devices, with the same wireless device, or both. For example, while operating in a dual connectivity mode, the UE 115 may establish a first wireless connection with the first wireless device 205-*a* using the first communication link 210-*a*, and may establish a second wireless connection with the second wireless device 205-*b* using the second communication link 210-*b*. By way of another example, the UE 115 may be configured to establish a first wireless connection and a second wireless connection with the first wireless device 205-*a* using the communication link 210-*a*. In some implementations, a first wireless connection of the dual connectivity mode at the UE 115 may be associated with a master cell group (MCG), and a second wireless connection of the dual connectivity mode may be associated with a secondary cell group (SCG).

In some aspects, the wireless communications system 200 may support techniques for dynamically allocating transmit power (e.g., power resources) across multiple wireless connections at the UE 115 based on a relative energy efficiency (e.g., energy/byte, energy/bit) of each of the wireless connections. In some aspects, the wireless communications system 200 may support techniques for allocating (e.g., assigning) more power resources to wireless connections with better energy efficiency metrics (e.g., lower energy/bit) in order to improve (maximize) overall data throughput at the UE 115. By enabling the UE 115 to allocate transmit power (e.g., power resources) across the wireless connections based on a relative energy efficiency of the respective wireless connections, techniques described herein may enable the UE 115 to maintain compliance with applicable regulatory constraints/parameters (e.g., SAR, MPE), while simultaneously increasing/maximizing data throughput (uplink throughput) at the UE 115.

For example, the UE 115 may establish a first wireless connection with the first wireless device 205-*a*. In some cases, the UE 115 may establish the first wireless connection by performing an access procedure with the first wireless device 205-*a*. The first wireless connection may include an LTE connection, an NR connection, or the like. Moreover, the first wireless connection may include a wireless connection with an MCG, an SCG, or both. Moreover, the UE 115 may establish a second wireless connection with the first wireless device 205-*a*, the second wireless device 205-*b*, or both. In some cases, the UE 115 may establish the second wireless connection by performing an access procedure with the first wireless device 205-*a* and/or the second wireless device 205-*b*. The UE 115 may establish the first wireless connection and the second wireless connection while operating in a dual connectivity mode. In other words, the first wireless connection at 320 and the second wireless connection at 325 may operate in the dual connectivity mode at the UE 115.

The second wireless connection may be associated with a same or different radio access technology (e.g., 4G, LTE, 5G, NR) as compared to the first wireless connection. As such, the respective wireless connections may include any pair of wireless connections in the context of dual connectivity. For example, the respective wireless connections may include LTE+FR1, FR1+FR1, FR1+FR2, LTE+FR2, and the like. Moreover, the first wireless connection and the second wireless connection may be established via a same or different component carriers (e.g., PCC, SCC), same or different cell groups (e.g., MCG, SCG), or any combination thereof. For example, in some cases, the first wireless connection may include a wireless connection for an MCG, and the second wireless connection may include a wireless connection for an SCG. In other cases, the first wireless connection may be established via a PCC, and the second wireless connection may be established via an SCC.

For the purposes of simplicity, FIG. 2 will described herein as including a first wireless connection between the UE 115 and the first wireless device 205-*a* (via communication link 210-*a*), and a second wireless connection between the UE 115 and the second wireless device 205-*b* (via communication link 210-*b*). However, this is not to be regarded as a limitation of the present disclosure, unless noted otherwise herein. In particular, in some implementations, the UE 115 may establish multiple wireless connections with the first wireless device 205-*a*, and/or multiple wireless connections with the second wireless device 205-*b*.

In some aspects, the UE 115 may identify one or more parameters (e.g., constraints) associated with a transmit power of communications performed at the UE 115. In other words, the UE 115 may identify one or more regulatory or other applicable constraints associated with a transmit power of communications transmitted by the UE 115. Parameters (e.g., constraints) associated with a transmit power of communications performed at the UE 115 may include SAR, MPE, or both. Other parameters/constraints may be applicable to the transmit power at the UE 115.

The UE 115 may identify energy efficiency metrics associated with the first wireless connection and the second wireless connection. For example, the UE 115 may identify a first energy efficiency metric associated with the first wireless connection, and a second energy efficiency metric associated with the second wireless connection. The energy efficiency metrics may include any metric or unit which describes how much energy it takes to transmit data over each of the respective wireless connections (e.g., energy/bit, energy/byte). Energy efficiency metrics (e.g., energy/bit) may provide useful metrics for end-to-end (E2E) link performance characterization of the respective wireless connections, including effects of different link budgets, and different uplink MCSs and/or PRBs scheduled by the respective wireless devices 205.

In some implementations, the UE 115 may be configured to identify the energy efficiency metrics of the respective wireless connections based on one or more parameters/ characteristics associated with the respective wireless connections including, but not limited to, MCSs, path loss, noise/interference, and the like. For example, the UE 115 may identify a first MCS associated with the first wireless connection with the first wireless device 205-*a* and a second MCS associated with the second wireless connection with the second wireless device 205-*b*, and may identify energy efficiency metrics for each of the wireless connections based on the respective MCSs.

In additional or alternative implementations, the UE 115 may identify the energy efficiency metrics of the respective wireless connections by performing measurements and/or receiving measurement reports associated with communications performed using the respective wireless connections. In other words, the UE 115 may determine channel estimates, path loss, or other parameters associated with the wireless connections by performing measurements or based on received measurement reports, and may identify the energy efficiency metrics for the respective wireless connections based on the determined parameters (e.g., channel estimates, path loss).

For example, in some cases, the UE 115 may perform a first set of measurements on messages transmitted and/or received via the first wireless connection, and may perform a second set of measurements on messages transmitted and/or received via the second wireless connection. In this example, the UE 115 may identify energy efficiency metrics for each of the wireless connections based on the respective sets of measurements. By way of another example, in other cases, the UE 115 may receive a first measurement report and second measurement report associated with communications performed using the first wireless connection and the second wireless connection, respectively. In this example, the UE 115 may identify energy efficiency metrics for each of the wireless connections based on the respective measurement reports.

After determining the energy efficiency metrics of the respective wireless connections, the UE 115 may compare the respective energy efficiency metrics to one another. The UE 115 may perform the comparison to determine which of the wireless connections is more energy efficient for transmitting data (e.g., more efficient for transmitting uplink messages). For example, the UE 115 may compare the first energy efficiency metric of the first wireless connection to the second energy efficiency metric of the second wireless connection. For the purposes of the present disclosure higher energy efficiency metrics may be associated with lower energy/bit or energy/byte values (more energy efficient), whereas lower energy efficiency metrics may be associated with higher energy/bit or energy/byte values (less energy efficient).

In some aspects, the UE 115 may allocate power resources (e.g., transmit power, transmit power resources) to the respective wireless connections. That is, the UE 115 may allocate a power resource (e.g., transmit power, energy) to antenna components associated with each of the respective wireless connections, where the allocated power resource may be used to transmit messages via each of the respective wireless connections. For example, the UE 115 may allocate a first power resource to the first wireless connection, a second power resource to the second wireless connection, or both. The UE 115 may be configured to allocate the power resource(s) based on establishing the first wireless connection and/or the second wireless connection, identifying the transmit power parameters/constraints, identifying the respective energy efficiency metrics, comparing the energy efficiency metrics, or any combination thereof.

For example, in some implementations, the UE 115 may be configured to allocate more transmit power (e.g., greater power resource) to the wireless connection which has the higher energy efficiency metric (e.g., more transmit power allocated to the more efficient wireless connection). In particular, the UE 115 may allocate the power resources in order to increase (e.g., maximize) an aggregate data throughput at the UE 115. For example, the UE 115 may allocate the power resources based on an aggregate data throughput associated with the first wireless connection and the second wireless connection satisfying (e.g., being greater than or equal to) a threshold data throughput. Moreover, the UE 115 may allocate the power resource(s) to the respective wireless connections such that the UE 115 may remain compliant with applicable parameters/constraints (e.g., SAR, MPE) associated with transmit power at the UE 115.

Further, the UE 115 may allocate the power resource(s) to the wireless connection(s) based on applicable transmit power bounds, or limits, for each of the respective wireless connections. In particular, each wireless connection (each link) may potentially have different minimum/maximum power limits (e.g., maximum/minimum power resource thresholds), where minimum power limits may be due to non-throttleable data (e.g., voice/control data), and maximum power limits may be due to target SNRs for highest supported MCSs, power classes, or other parameters for the respective wireless connections. Accordingly, the UE 115 may allocate the power resources based on (e.g., in accordance with) minimum and maximum power resource thresholds for each of the respective wireless connections.

The power resource(s) (e.g., transmit power(s)) allocated to the respective wireless connections may include any type of energy resource at respective points in time, across defined time intervals, or both. For example, the allocated power resources may include instantaneous power resources (e.g., instantaneous transmit power), a power resource/transmit power over a time interval (e.g., average transmit power over a time interval, including power=0 samples for when the UE 115 does not transmit during the defined time interval).

Allocation of power resource(s) across the respective wireless connections may be based on, or influenced by, various Layer 2 (L2), Layer 3 (L3), and network architectural aspects associated with the wireless communications system 200. As such, in additional or alternative implementations, the UE 115 may allocate the power resources (e.g., transmit powers) based on parameters/characteristics associated with communications at the UE 115. Parameters associated with communications at the UE 115 which may be used to allocate the power resources may include a presence (or absence) of voice traffic transmitted by the UE 115, whether voice traffic is communicated via the first wireless connection or the second wireless connection, default radio bearers at the UE 115, a presence (or absence) of internet traffic transmitted by the UE 115, whether internet traffic is communicated via the first wireless connection or the second wireless connection, configurations of data radio bearers (DRBs) (e.g., split DRB, non-split DRB) for the respective wireless connections, or any combination thereof.

In some cases, the cell group (e.g., MCG, SCG) which carries voice and/or control traffic may be prioritized by reserving some minimum power for the respective cell group. For example, the UE 115 may allocate power resource(s) and the second power resource based at least in part on an absence of voice traffic at the UE 115, or whether voice traffic at the UE 115 is communicated via the first wireless connection, the second wireless connection, or a combination thereof. Voice traffic in dual connectivity scenarios is generally communicated via MCG or SCG RLC unacknowledged mode (UM) DRB, and not on a split DRB. However, voice traffic may be split across wireless connections (e.g., split across MCG and SCG) in some wireless communications systems. Further, in some cases, the UE 115 may allocate power resources based on whether the wireless connection which is used to communicate voice traffic is also associated with a default radio bearer at the UE 115.

Similarly, the UE 115 may allocate the power resource(s) for the respective wireless connections based on which wireless connection is used to communicate internet traffic. For example, the UE 115 may allocate the first power resource and the second power resource to the first wireless connection and the second wireless connection, respectively, based on whether internet traffic at the UE is communicated via the first wireless connection, the second wireless connection, or both.

More specifically, the allocation of power resources may be based on whether the default data radio bearer (DRB) with traffic from internet packet data network (e.g., internet traffic) is split or non-split. In other words, the allocation of power resources may be based on a configuration of the DRBs used for communications at the UE 115. In some aspects, the configurations for DRBs may include a split radio bearer configuration and a non-split radio bearer configuration. For a non-split configuration (e.g., non-flexible), internet traffic may be communicated over one of the wireless connections (e.g., MCG or SCG), but not both. Comparatively, for a split configuration, internet traffic is flexible, and can go on either wireless connection. In a split configuration, the UE 115 may be configured to allocate more power resources for internet traffic on the wireless connection which is more energy efficient (e.g., higher energy efficiency metric, lower energy/byte). For example, the UE 115 may allocate the power resource(s) across the wireless connections based on a configuration of a first DRB associated with the first wireless connection (e.g., whether the first DRB has a split radio bearer configuration or a non-split radio bearer configuration), a second DRB associated with the second wireless connection (e.g., whether the second DRB has a split radio bearer configuration or a non-split radio bearer configuration), or both.

Table 1 below illustrates various rules or configurations which may be implemented by the UE 115 when allocating power resources across the respective wireless connections (e.g., allocating power resources to MCG and SCG). In particular, Table 1 illustrates rules for power sharing across MCG and SCG the context of a non-split default radio bearer, and in cases where the UE 115 has a full buffer. The term "full buffer" may be used herein to refer to cases when the uplink data volume (e.g., uplink data buffer) at the UE 115 is large enough that transport blocks (TBs) do not need to be padded, regardless of MCS. In other words, in cases where the UE 115 has a full buffer, the UE 115 may transmit signals over both the MCG and the SCG, as each link, on their own, does not have the capacity to handle all of the uplink data volume (UL data volume>ULDataSplitThreshold).

TABLE 1

Power Resource Allocation For Non-Split Default Radio Bearer

| Voice Traffic | Default Bearer | Power Allocation Between MCG and SCG |
|---|---|---|
| MCG | MCG | No power reserved for SCG. |
| | SCG | Rule 1: Reserve $P_{Ctrl}^{MCG} + P_{VoIP}^{MCG}$ on MCG and assign remaining to SCG, reserving $P_{Ctrl}^{SCG} + P_{HP}^{SCG}$ before allocating power to low-priority data |

TABLE 1-continued

Power Resource Allocation For Non-Split Default Radio Bearer

| Voice Traffic | Default Bearer | Power Allocation Between MCG and SCG |
|---|---|---|
| SCG | MCG | Rule 2: Reserve $P_{VoIP}^{SCG}$ on SCG and assign remaining to MCG, reserving $P_{Ctrl}^{MCG} + P_{HP}^{MCG}$ before allocating power to low-priority data |
| | SCG | Rule 3: Reserve $P_{Ctrl}^{MCG}$ on MCG and assign remaining to SCG, reserving $P_{Ctrl}^{SCG} + P_{VoIP}^{SCG} + P_{HP}^{SCG}$ before allocating to low-priority data |
| Absent | MCG | No power reserved for SCG. |
| | SCG | Rule 4: Reserve power for SRB/control traffic on MCG, and assign remaining power to SCG |

The term $P_{Ctrl}^{i}(P_{Ctrl}^{MCG}, P_{Ctrl}^{SCG})$ refers to power resources needed for control traffic on link i during the next $T_{Eval}$ time interval, including control traffic for signaling radio bearer (SRB), sounding reference signal (SRS), PUCCH, DMRS, and the like. Different types of control traffic may exist on each of the respective links (each of the respective wireless connections) simultaneously. The term $P_{HP}^{i}(P_{HP}^{MCG}, P_{HP}^{SCG})$ refers to power resources needed for high-priority traffic (traffic in a high-priority queue of the UE 115) on the default radio bearer on link i during the next $T_{Eval}$ time interval. In some aspects, high-priority traffic (and therefore $P_{HP}^{i}$) may only be communicated/allocated wo the wireless connection/link with the default radio bearer. The term $P_{VoIP}^{i}(P_{VoIP}^{MCG}, P_{VoIP}^{SCG})$ refers to power resources needed for voice traffic on link i during the next $T_{Eval}$ time interval. In some cases, voice traffic may be communicated on MCG or SCG, but not both (e.g., voice traffic is not split across wireless connections). Moreover, in addition to the power allocation rules illustrated in Table 1, if physical random access (PRACH) traffic is to be transmitted by the UE 115 during the next $T_{Eval}$ time interval, the UE 115 may also be configured to reserve power resources ($P_{RACH}^{i}$) for random access (RACH) traffic on link i during the next $T_{Eval}$ time interval.

In some aspects, the UE 115 may allocate the power resources across the respective wireless connections based on what traffic at the UE 115 is throttleable or non-throttleable. The term "throttleable traffic" may refer to traffic which does not have a set or minimum throughput, such as internet traffic. Comparatively, the term "non-throttleable traffic" may refer to traffic which does have a set or minimum throughput, such as voice traffic. In some implementations, power resources for non-throttleable traffic may be determined by traffic patterns for the respective wireless connections, power used (e.g., energy efficiency metrics) for the respective wireless connections, an $MCS_{Target}$ for the respective wireless connections, or any combination thereof.

As shown in Table 1 above, the allocation of power resources across the respective wireless connections (e.g., across MCG and SCG) may be dependent on a presence (or absence) and location of voice traffic (e.g., whether voice traffic is communicated over MCG or SCG), as well as whether the default radio bearer is associated with the MCG and SCG. In the context of non-split default radio bearers, as illustrated in Table 1, internet traffic may only be transmitted via the default radio bearer. For example, referring to Rule 1 in Table 2, internet traffic is only communicated over the SCG as the default radio bearer. Further, the rules illustrated in Table 1 give precedence, or priority, to high-priority traffic before allocating power resources for low-priority traffic.

It is noted herein that Rules 2 and 3 in Table 1 above (e.g., scenarios where voice traffic is communicated via SCG) are not valid for FR1+FR2 or LTE+FR2 dual connectivity scenarios, as voice traffic may not be communicated via mmW in some wireless communications systems.

The rules/parameters for allocating power across the MCG and SCG for non-split default radio bearers illustrated in Table 1 will be further shown and described with reference to FIG. 4.

Table 2 below illustrates additional or alternative rules or configurations which may be implemented by the UE 115 when allocating power resources across the respective wireless connections (e.g., allocating power resources to MCG and SCG). In particular, Table 2 illustrates rules for power sharing across MCG and SCG the context of a split default radio bearer (e.g., default radio bearer is split across MCG+SCG), and in cases where the UE 115 has a full buffer (UL data volume>ul-DataSplitThreshold). Thus, Table 2 illustrates rules for allocating power resources when data will be transmitted over both the MCG and the SCG.

TABLE 2

Power Resource Allocation For Split Default Radio Bearer

| Voice Traffic | Power Allocation Between MCG and SCG |
|---|---|
| MCG | Reserve power $P_{Ctrl}^{MCG} + P_{VoIP}^{MCG}$ on MCG and $P_{Ctrl}^{SCG}$ SCG. The remaining power is split to maximize uplink throughput across two links to serve high-priority and low-priority traffic on default bearer. |
| SCG | Reserve power $P_{Ctrl}^{MCG}$ on MCG and $P_{Ctrl}^{SCG} + P_{VoIP}^{SCG}$ on SCG. The remaining power is split to maximize uplink throughput across two links to serve high-priority and low-priority traffic on default bearer. |
| Absent | Reserve power $P_{Ctrl}^{MCG}$ on MCG and $P_{Ctrl}^{SCG}$ on SCG. The remaining power is split to maximize uplink throughput across two links to serve high-priority and low-priority traffic on default bearer. |

As compared to Table 1, which illustrates rules for allocating power resources in the context of a non-split DRB (e.g., internet traffic is communicated over the MCG or SCG, but not both), Table 2 illustrates rules for allocating power resources in the context of a split DRB. As such, for Table 2, internet traffic may be split across both the MCG and the SCG (as compared to Table 1, in which case internet traffic may only be transmitted via the default radio bearer). Once again, it is noted herein that the rule for allocating power resources in Table 2 where voice traffic is communicated via SCG may not be valid for FR1+FR2 or LTE+FR2 dual connectivity scenarios, as voice traffic may not be communicated via mmW in some wireless communications systems.

The rules/parameters for allocating power across the MCG and SCG for split default radio bearers illustrated in Table 2 will be further shown and described with reference to FIG. 5.

In some implementations, the power resource allocation techniques described herein may also be extended to the context of multiple non-split DRBs on MCG and SCG. Such techniques may be valid for all dual connectivity scenarios (e.g., LTE+FR1, FR1+FR1, FR1+FR2, FR2+FR2, LTE+FR2). For example, the terms $B_{MCG}^t$ and $B_{SCG}^t$ may denote throttleable traffic across all DRBs for MCG and SCG, respectively, and the terms $B_{MCG}^{nt}$ and $B_{SCG}^{nt}$ may denote non-throttleable traffic (e.g., VoIP and control traffic) for MCG and SCG, respectively. In this example, the UE 115 may be configured to first allocate initial power resources to MCG and SCG as described in Table 1 above and in FIG. 4 below. Initial power resources for MCG and SCG may be denoted by $P_{MCG}^*$ and $P_{SCG}^*$, respectively. After allocating initial power resources, the UE 115 may be configured to check if a resultant capacity for link i is greater than the total pending traffic of throttleable and non-throttleable traffic $(B_i^t + B_i^{nt})$ for link i, where i includes MCG or SCG. If $C_i(P_i^*) > B_i^t + B_i^{nt}$ for the respective link i (e.g., for MCG or SCG), where $C_i$ represents achievable capacity for link i at power $P_i^*$, the UE 115 may be configured to cap (e.g., limit, selectively reduce) $P_i^*$ to $P_i^{}$ such that $C_i(P_i^{}) > B_i^t + B_i^{nt} + M$. In such cases, the term M may be non-zero (M>0) and represents some margin to avoid under-allocating power resources to the respective link i due to capacity estimation error. Moreover, if the capacity of both links (both MCG and SCG) is capped due to $C_i(P_i^*) > B_i^t + B_i^{nt}$, the UE 115 may be configured to conserve some excess power for future use. Otherwise, if only one of the links (e.g., one of MCG or SCG) is capped, the UE 115 may be configured to allocate spill-over power to the other non-capped link, considering constraints (e.g., SAR, MPE) for the other non-capped link.

Similarly, the power resource allocation techniques described herein may also be extended to the context of multiple split DRBs with no MCG-only or SCG-only DRB. Such techniques may be valid for all dual connectivity scenarios (e.g., LTE+FR1, FR1+FR1, FR2+FR2, FR1+FR2, LTE+FR2). For example, the UE 115 may identify a full buffer for each split DRB exceeds a data split threshold (UL data volume for each splitDRB>ul-DataSplitThreshold). In such cases, the total volume of uplink traffic at the UE 115 for all DRBs may be drained using both MCG and SCG. Accordingly, the UE 115 may be configured to allocate power resources to each link (e.g., MCG, SCG) in such a manner as to maximize the total data throughput at the UE 115. In particular, in the case of multiple split DRBs, the UE 115 may allocate power resources across the respective wireless connections in accordance with the rules illustrated in Table 2 and FIG. 5.

Moreover, power resource allocation techniques described herein may also be extended to the context of multiple split and non-split DRBs. For example, in such cases, the term $B_{Split}^t$ may denote throttleable traffic across all split DRBs. In this example, the UE 115 may again be configured to first allocate initial power resources $P_{MCG}^*$ and $P_{SCG}^*$, to MCG and SCG, respectively. After allocating initial power resources, the UE 115 may be configured to check if a resultant capacity for link i is greater than the total split and non-split traffic for link i where i includes MCG or SCG. If $C_i(P_i^*) > B_i^t + B_i^{nt} + B_{Split}^t$ for the respective link i (e.g., for MCG or SCG), UE 115 may be configured to cap (e.g., limit, selectively reduce) $P_i^*$ to $P_i^{}$ such that $C_i(P_i^{}) > B_i^t + B_i^{nt} + B_{Split}^t + M$, where M>0 and represents some margin to avoid under-allocating power resources to the respective link i due to capacity estimation error. Moreover, the UE 115 may cap the power allocation to the other link j from $P_j^*$ to $P_j^{}$ such that $C_j(P_j^{}) > B_j^t + B_j^{nt} + M$, where link j represents the other link/wireless connection relative to link i (e.g., if i=SCG, j=MCG, and vice versa). Otherwise, if $B_i^t + B_i^{nt} < C_i(P_i^*) < B_i^t + B_i^{nt} + B_{Split}^t$, then the UE 115 may cap the power resource for the other link j from $P_j^*$ to $P_j^{}$ such that $C_j(P_j^{}) = B_j^t + B_j^{nt} + [B_i^t + B_i^{nt} + B_{Split}^t - C_i(P_i^*)] + M$.

In some aspects, the UE 115 may be configured to allocate power resources across multiple component carriers (e.g., carrier aggregation). For example, the UE 115 may establish a first wireless connection and a second wireless connection via a first component carrier and a second component carrier, respectively, and may allocate power resources across the respective component carriers/wireless connections as described herein. In this example, the UE 115 may operate in an NR standalone (SA) mode with mixed numerology, where the first carrier is associated with sub6 communications and the second component carrier is associated with mmW. In such cases, voice traffic (e.g., VoIP) may only be communicated via the sub6 component carrier, as voice traffic generally may not be communicated via mmW. Moreover, either the sub6 component carrier or the mmW component carrier may include a PCC.

Table 3 below illustrates additional or alternative rules or configurations which may be implemented by the UE 115 when allocating power resources in the context of carrier aggregation (e.g., allocating power resources across multiple component carriers).

TABLE 3

| Voice Traffic | Tech on PCC | Power Allocation Between PCC and SCC |
|---|---|---|
| Absent | FR1 FR2 | Reserve power on PCC to transmit SRB, control traffic, and high-priority traffic. |
| Present | FR1 | Reserve power on PCC to transmit VoIP traffic, SRB, control traffic, and high-priority traffic. |
|  | FR2 | Reserve power on SCC to transmit VoIP traffic, SRB, control traffic, and high-priority traffic. |

Continuing with reference to FIG. 2, by allocating the power resources to the respective wireless connections, the UE 115 may thereby maximize throughput at the UE 115 without violating applicable constraints (e.g., SAR, MPE). Moreover, the UE 115 may be configured to communicate some information to the wireless devices 205 in order to prevent the UE 115 from being scheduled to perform transmissions which would exceed the allocated power resources, or violate the applicable constraints. The UE 115 may be able to achieve this objective by reporting the allocated power resources, a PHR, and/or a BSR to the respective wireless devices 205.

For example, in some cases, the UE 115 may transmit reports (e.g., Type-I PHR messages) to each of the wireless device 205 in an attempt to limit or control a quantity and type of messages (e.g., limit uplink grant size) which the respective wireless device 205 schedules to be performed by the UE 115. In cases where Type-I PHR messages do not succeed in limiting a grant size scheduled by the wireless devices 205, the UE 115 may be configured to "spoof" or "fake" PHR and/or BSR values for the default DRB on each respective wireless connection.

For example, in some cases, the UE 115 may identify an available PHR and/or a message buffer queue (e.g., BSR) associated with the UE 115. That is, the UE 115 may identify an available PHR at the UE 115 and/or a quantity of messages waiting to be transmitted by the UE 115 in a buffer status queue for the UE 115. The UE 115 may identify the available PHR and/or message buffer queue based on establishing the first and/or second wireless connections, identifying the transmit power parameters/constraints, identifying the respective energy efficiency metrics, comparing the energy efficiency metrics, allocating the power resources to the respective links, or any combination thereof.

The UE 115 may then be configured to selectively adjust the available PHR and/or buffer status report (e.g., BSR) to generate an adjusted PHR and/or adjusted buffer status queue (e.g., adjusted BSR). In particular, the UE 115 may selectively adjust the available PHR and/or buffer status queue in order to ensure that the UE 115 remains compliant with applicable parameters/constraints (e.g., SAR, MPE) associated with transmit powers at the UE 115. As such, the UE 115 may selectively adjust (e.g., "spoof," fake) the identified PHR and/or buffer status queue to generate the adjusted PHR and/or adjusted buffer status queue. The UE 115 may be configured to adjust (e.g., spoof, fake) PHR and/or BSR values by mapping allocated power resources for each respective wireless connection to maximum permissible bytes on each respective wireless connection.

In some aspects, the UE 115 may transmit, to the first wireless device 205-*a*, the second wireless device 205-*b*, or both, a control message 215 (e.g., control message 215-*a*, control message 215-*b*) which indicates a set of characteristics associated with wireless communications at the UE 115. In particular, the control message 215 may indicate characteristics associated with communications which are transmitted by the UE 115, including the power resources allocated to each respective wireless connection, the adjusted PHR and/or adjusted buffer status queue (e.g., adjusted BSR), or any combination thereof. In this regard, the UE 115 may report adjusted (e.g., "spoofed") PHR and/or adjusted buffer status queue values to the respective wireless devices 305 in order to prevent the respective wireless devices 205 from scheduling communications (e.g., uplink communications) at the UE 115 which may cause the UE 115 to run afoul of applicable transmit power constraints (e.g., SAR, MPE). In other words, the UE 115 may report artificially adjusted PHR/BSR values to the wireless devices 205 in an attempt to control transmissions (and therefore transmit power) at the UE 115.

In some aspects, the UE 115 may receive, from the first wireless device 205-*a*, the second wireless device 205-*b*, or both, a grant 220 (e.g., grant 220-*a*, grant 220-*b*) which schedules one or more messages to be transmitted by the UE 115. The grant 220 may be indicated via a downlink control information (DCI) message, an RRC message, a MAC-CE, or any combination thereof.

In some implementations, the first wireless device 205-*a* and/or the second wireless device 205-*b* may transmit the grant 220 scheduling messages to be transmitted by the UE 115 based on the characteristics which were reported via the control message 215-*a* and/or control message 215-*b*. That is, the wireless devices 205 may take the adjusted (e.g., "spoofed) PHR and/or adjusted BSR values into account when scheduling transmissions to be performed by the UE 115. Moreover, in cases where the UE 115 reports (via the control message 215) the power resources which were allocated to each respective wireless connection, the wireless devices 205 may schedule (via the grant 220) transmissions to be performed by the UE 115 such that the scheduled transmissions do not exceed the allocated power resources.

The UE 115 may transmit, to the first wireless device 205-*a*, a first message 225-*a* (e.g., first uplink message) via the first wireless connection. In particular, the UE 115 may transmit the first message 225-*a* based on (e.g., in accordance with) the first power resource (e.g., first transmit power) which was allocated to the first wireless connection. In some cases, the UE 115 may transmit the first message 225-*a* to the first wireless device 205-*a* in response to receiving the grant 220-*a* from the first wireless device 205-*a* which scheduled the first message 225-*a*.

Similarly, the UE 115 may transmit, to the second wireless device 205-*b*, a second message 225-*b* (e.g., second uplink message) via the second wireless connection. In particular, the UE 115 may transmit the second message 225-*b* based on (e.g., in accordance with) the second power resource (e.g., second transmit power) which was allocated to the second wireless connection. In some cases, the UE 115 may transmit the second message 225-*b* to the second wireless device 205-*b* in response to receiving the grant 220-*b* from the second wireless device 205-*b* which scheduled the second message 225-*b*.

Techniques described herein may enable for the UE 115 and other wireless devices to maintain compliance with applicable regulatory constraints (e.g., SAR, MPE) in the context of dual connectivity. In particular, by allocating transmit power across wireless connections based on a relative energy efficiency of the respective wireless connections, techniques described herein may enable the UE 115 to increase (e.g., maximize) data throughput at the UE 115 across the respective wireless connections while sustaining non-throttleable traffic and ensuring compliance with applicable regulatory constraints. Accordingly, aspects of the present disclosure may improve data throughput within the wireless communications system, limit radiation exposure to human tissue, and increase the effectiveness and widespread use of dual connectivity.

Figure 3:
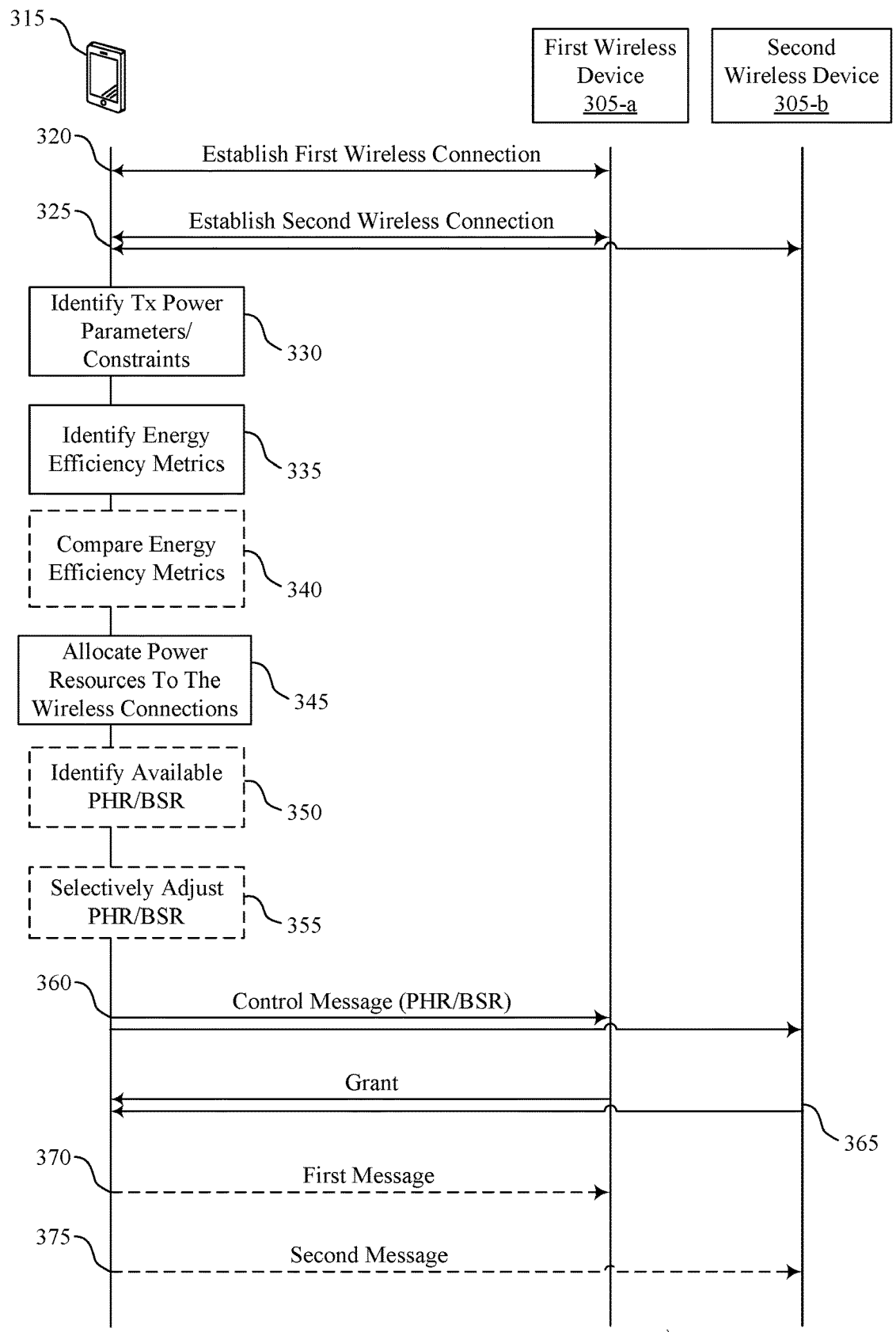
FIG. 3 illustrates an example of a process flow that supports techniques for transmit power allocation in dual connectivity in accordance with aspects of the present disclosure.

FIG. 3 illustrates an example of a process flow 300 that supports techniques for transmit power allocation in dual connectivity in accordance with aspects of the present disclosure. In some examples, process flow 300 may implement, or be implemented by, aspects of wireless communications system 100, wireless communications system 200, or both.

The process flow 300 may include a UE 315, a first wireless device 305-*a*, and a second wireless device 305-*b*, which may be examples of UEs 115, base stations 105, and other wireless devices as described with reference to FIGS. 1 and 2. In particular, the UE 315, the first wireless device 305-*a*, and the second wireless device 305-*b* illustrated in FIG. 3 may include examples of the UE 115, the first wireless device 305-*a*, and the second wireless device 305-*b*, illustrated in FIG. 2, respectively. In this regard, the first wireless device 305-*a* and the second wireless device 305-*b* may include, but are not limited to, base stations 105, IAB nodes, AR glasses, VR glasses, and the like.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 320, the UE 315 may establish a first wireless connection with the first wireless device 305-*a*. In some cases, the UE 315 may establish the first wireless connection by performing an access procedure with the first wireless device 305-*a*. The first wireless connection may include an LTE connection, an NR connection, a WLAN connection or the like. Moreover, the first wireless connection may include a wireless connection with an MCG, an SCG, or both.

At 320, the UE 315 may establish a second wireless connection with the first wireless device 305-*a*, the second wireless device 305-*b*, or both. In some cases, the UE 315 may establish the second wireless connection by performing an access procedure with the first wireless device 305-*a* and/or the second wireless device 305-*b*. The UE 315 may establish the first wireless connection and the second wireless connection while operating in a dual connectivity mode. In other words, the first wireless connection at 320 and the second wireless connection at 325 may operate in the dual connectivity mode at the UE 315.

The second wireless connection may be associated with a same or different radio access technology (e.g., 4G, LTE, 5G, NR) as compared to the first wireless connection. Moreover, the first wireless connection and the second wireless connection may be established via a same or different component carriers (e.g., PCC, SCC), same or different cell groups (e.g., MCG, SCG), or any combination thereof. For example, in some cases, the first wireless connection may include a wireless connection for an MCG, and the second wireless connection may include a wireless connection for an SCG. In other cases, the first wireless connection may be established via a PCC, and the second wireless connection may be established via an SCC. In some implementations, the first and second wireless connections may be used in the context of carrier aggregation methods.

At 330, the UE 315 may identify one or more parameters (e.g., constraints) associated with a transmit power of communications performed at the UE 315. In other words, the UE 315 may identify one or more regulatory constraints, power class limitations, power amplifier limitations, thermal limitations, or other applicable constraints associated with a transmit power of communications transmitted by the UE 315. Parameters (e.g., constraints) associated with a transmit power, transmit energy, and/or transmitter exposure of communications performed at the UE 315 may include SAR, MPE, or both. Other parameters/constraints may be applicable to the transmit power at the UE 315. The UE 315 may identify the transmit power parameters/constraints at 335 based on establishing the first wireless connection at 320, establishing the second wireless connection at 325, or both.

At 335, the UE 315 may identify energy efficiency metrics associated with the first wireless connection and the second wireless connection. For example, the UE 315 may identify a first energy efficiency metric associated with the first wireless connection, and a second energy efficiency metric associated with the second wireless connection. The energy efficiency metrics may include any metric or unit which describes how much energy it takes to transmit data over each of the respective wireless connections (e.g., energy/bit, energy/byte). The UE 315 may identify the energy efficiency metrics based on establishing the first wireless connection at 320, establishing the second wireless connection at 325, identifying the transmit power parameters/constraints at 330, or any combination thereof.

In some implementations, the UE 315 may be configured to identify the energy efficiency metrics of the respective wireless connections based on one or more parameters/characteristics associated with the respective wireless connections including, but not limited to, MCSs, path loss, noise/interference, and the like. For example, the UE 315 may identify a first MCS associated with the first wireless connection and a second MCS associated with the second wireless connection, and may identify energy efficiency metrics for each of the wireless connections based on the respective MCSs.

In additional or alternative implementations, the UE 315 may identify the energy efficiency metrics of the respective wireless connections by performing measurements and/or receiving measurement reports associated with communications performed using the respective wireless connections. In other words, the UE 315 may determine channel estimates, path loss, or other parameters associated with the wireless connections by performing measurements or based on received measurement reports, and may identify the energy efficiency metrics for the respective wireless connections based on the determined parameters (e.g., channel estimates, path loss).

For example, in some cases, the UE 315 may perform a first set of measurements on messages transmitted and/or received via the first wireless connection, and may perform a second set of measurements on messages transmitted and/or received via the second wireless connection. In this example, the UE 315 may identify energy efficiency metrics for each of the wireless connections based on the respective sets of measurements. By way of another example, in other cases, the UE 315 may receive a first measurement report and second measurement report associated with communications performed using the first wireless connection and the second wireless connection, respectively. In this example, the UE 315 may identify energy efficiency metrics for each of the wireless connections based on the respective measurement reports.

At 340, the UE 315 may compare the energy efficiency metrics of the respective wireless connections. The UE 315 may perform the comparison to determine which of the wireless connections is more energy efficient for transmitting data (e.g., more efficient for transmitting uplink messages). For example, the UE 315 may compare the first energy efficiency metric of the first wireless connection to the second energy efficiency metric of the second wireless connection. The UE 315 may perform the comparison at 340 based on establishing the first wireless connection at 320, establishing the second wireless connection at 325, identifying the transmit power parameters/constraints at 330, identifying the respective energy efficiency metrics at 335, or any combination thereof.

At 345, the UE 315 may allocate power resources (e.g., transmit power, transmit power resources or transmit energy) to the respective wireless connections. In some aspects, the UE 315 may allocate energy, where the allocated power resources are then derived according with the duration of time available to expend the allocated energy. That is, the UE 315 may allocate a power resource (energy) to antenna components associated with each of the respective wireless connections, where the allocated power resource may be used to transmit messages via each of the respective wireless connections. For example, the UE 315 may allocate a first power resource to the first wireless connection, a second power resource to the second wireless connection, or both. The UE 315 may be configured to allocate the power resource(s) at 345 based on establishing the first wireless connection at 320, establishing the second wireless connection at 325, identifying the transmit power parameters/constraints at 330, identifying the respective energy efficiency metrics at 335, comparing the energy efficiency metrics at 340, or any combination thereof.

For example, in some implementations, the UE 315 may be configured to allocate more transmit power (e.g., greater power resource) to the wireless connection which has the higher energy efficiency metric (e.g., more transmit power allocated to the more efficient wireless connection). In particular, the UE 315 may allocate the power resources in order to increase (e.g., maximize) an aggregate data throughput at the UE 315. For example, the UE 315 may allocate the power resources based on an aggregate data throughput associated with the first wireless connection and the second wireless connection satisfying a threshold data throughput. Moreover, the UE 315 may allocate the power resource(s) to the respective wireless connections such that the UE 315 may remain compliant with applicable parameters/constraints (e.g., SAR, MPE) associated with transmit power at the UE 315 which were determined at 330.

Further, the UE 315 may allocate the power resource(s) to the wireless connection(s) based on applicable transmit power bounds, or limits, for each of the respective wireless connections. In particular, each wireless connection (each link) has potentially different minimum/maximum power limits (e.g., maximum/minimum power resource thresholds), where minimum power limits may be due to non-throttleable data (e.g., voice/control data), and maximum power limits may be due to target SNRs for highest supported MCSs, power classes, or other parameters for the respective wireless connections. Accordingly, the UE 315 may allocate the power resources based on (e.g., in accordance with) minimum and maximum power resource thresholds for each of the respective wireless connections.

The power resource(s) (e.g., transmit power(s)) allocated to the respective wireless connections may include any type of energy resource at respective points in time, across defined time intervals, or both. For example, the allocated power resources may include instantaneous power resources (e.g., instantaneous transmit power), a power resource/transmit power over a time interval (e.g., average transmit power over a time interval, including power=0 samples for when the UE 315 does not transmit during the defined time interval).

In additional or alternative implementations, as described previously herein, the UE 315 may allocate the power resources (e.g., transmit powers) at 345 based on parameters/characteristics associated with communications at the UE 315. Parameters associated with communications at the UE 315 which may be used to allocate the power resources may include a presence (or absence) of voice traffic transmitted by the UE 315, whether voice traffic is communicated via the first wireless connection or the second wireless connection, default radio bearers at the UE 315, a presence (or absence) of internet traffic transmitted by the UE 315, whether internet traffic is communicated via the first wireless connection or the second wireless connection, configurations of DRBs (e.g., split DRB, non-split DRB) for the respective wireless connections, or any combination thereof.

At 350, the UE 315 may identify an available PHR and/or a message buffer queue (e.g., BSR) associated with the UE 315. That is, the UE 315 may identify an available PHR at the UE 315 and/or a quantity of messages waiting to be transmitted by the UE 315 in a buffer status queue for the UE 315. The UE 315 may identify the available PHR and/or message buffer queue at 350 based on establishing the first wireless connection at 320, establishing the second wireless connection at 325, identifying the transmit power parameters/constraints at 330, identifying the respective energy efficiency metrics at 335, comparing the energy efficiency metrics at 340, allocating the power resources at 345, or any combination thereof.

At 355, the UE 315 may selectively adjust the available PHR and/or buffer status report (e.g., BSR) which were determined at 355 to generate an adjusted PHR and/or adjusted buffer status queue (e.g., adjusted BSR). In particular, the UE 315 may selectively adjust the available PHR and/or buffer status queue in order to ensure that the UE 315 remains compliant with applicable parameters/constraints (e.g., SAR, MPE) associated with transmit powers at the UE 315. As such, the UE 315 may selectively adjust (e.g., "spoof," fake) the identified PHR and/or buffer status queue to generate the adjusted PHR and/or adjusted buffer status queue.

At 360, the UE 315 may transmit, to the first wireless device 305-*a*, the second wireless device 305-*b*, or both, a control message which indicates a set of characteristics associated with wireless communications at the UE 315. In particular, the control message may indicate characteristics associated with communications which are transmitted by the UE 315. The UE 315 may transmit the control message at 360 based on identifying the transmit power parameters/constraints at 330, identifying the respective energy efficiency metrics at 335, comparing the energy efficiency metrics at 340, allocating the power resources at 345, identifying and/or adjusting the available PHR/buffer status queue at 350 and 355, or any combination thereof.

Characteristics associated with wireless communications at the UE 315 which may be indicated via the control message may include the power resources which were allocated at 345, the adjusted PHR and/or adjusted buffer status queue (e.g., adjusted BSR) generated at 355, or any combination thereof. In this regard, the UE 315 may report adjusted (e.g., "spoofed") PHR and/or adjusted buffer status queue values to the respective wireless devices 305 in order to prevent the respective wireless devices 305 from scheduling communications (e.g., uplink communications) at the UE 315 which may cause the UE 315 to run afoul of applicable transmit power constraints (e.g., SAR, MPE). In some cases the UE 315 may transmit a BSR reporting different buffer sizes associated with the respective systems/wireless connections, as the BSR report is generated/spoofed according to the link energy efficiency. In other words, the UE 315 may report artificially adjusted PHR/BSR values to the wireless devices 305 in an attempt to control transmissions (and therefore transmit power) at the UE 315.

At 365, the UE 315 may receive, from the first wireless device 305-*a*, the second wireless device 305-*b*, or both, a grant which schedules one or more messages to be transmitted by the UE 315. The grant may be indicated via a DCI message, an RRC message, a MAC-CE, or any combination thereof.

In some implementations, the first wireless device 305-*a* and/or the second wireless device 305-*b* may transmit the grant scheduling messages to be transmitted by the UE 315 based on the characteristics which were reported via the control message at 360. That is, the wireless devices 305 may take the adjusted (e.g., "spoofed) PHR and/or adjusted BSR values into account when scheduling transmissions to be performed by the UE 315. Moreover, in cases where the UE 315 reports (via the control message) the power resources which were allocated to each respective wireless connection, the wireless devices 305 may schedule (via the grant) transmissions to be performed by the UE 315 such that the scheduled transmissions do not exceed the allocated power resources.

At 370, the UE 315 may transmit, to the first wireless device 305-*a*, a first message (e.g., first uplink message) via the first wireless connection. In particular, the UE 315 may transmit the first message based on (e.g., in accordance with) the first power resource (e.g., first transmit power) which was allocated to the first wireless connection at 345. In some cases, the UE 315 may transmit the first message to the first wireless device 305-*a* in response to receiving a grant from the first wireless device 305-*a* which scheduled the first message.

At 375, the UE 315 may transmit, to the second wireless device 305-*b*, a second message (e.g., second uplink message) via the second wireless connection. In particular, the UE 315 may transmit the second message based on (e.g., in accordance with) the second power resource (e.g., second transmit power) which was allocated to the second wireless connection at 345. In some cases, the UE 315 may transmit the second message to the second wireless device 305-*b* in response to receiving a grant from the second wireless device 305-*b* which scheduled the second message.

Techniques described herein may enable for the UE 315 and other wireless devices to maintain compliance with applicable regulatory constraints (e.g., SAR, MPE) in the context of dual connectivity. In particular, by allocating transmit power across wireless connections based on a relative energy efficiency of the respective wireless connections, techniques described herein may enable the UE 315 to increase (e.g., maximize) data throughput at the UE 315 across the respective wireless connections while sustaining non-throttleable traffic and ensuring compliance with applicable regulatory constraints. Accordingly, aspects of the present disclosure may improve data throughput within the wireless communications system, limit radiation exposure to human tissue, and increase the effectiveness and widespread use of dual connectivity.

Figure 4:
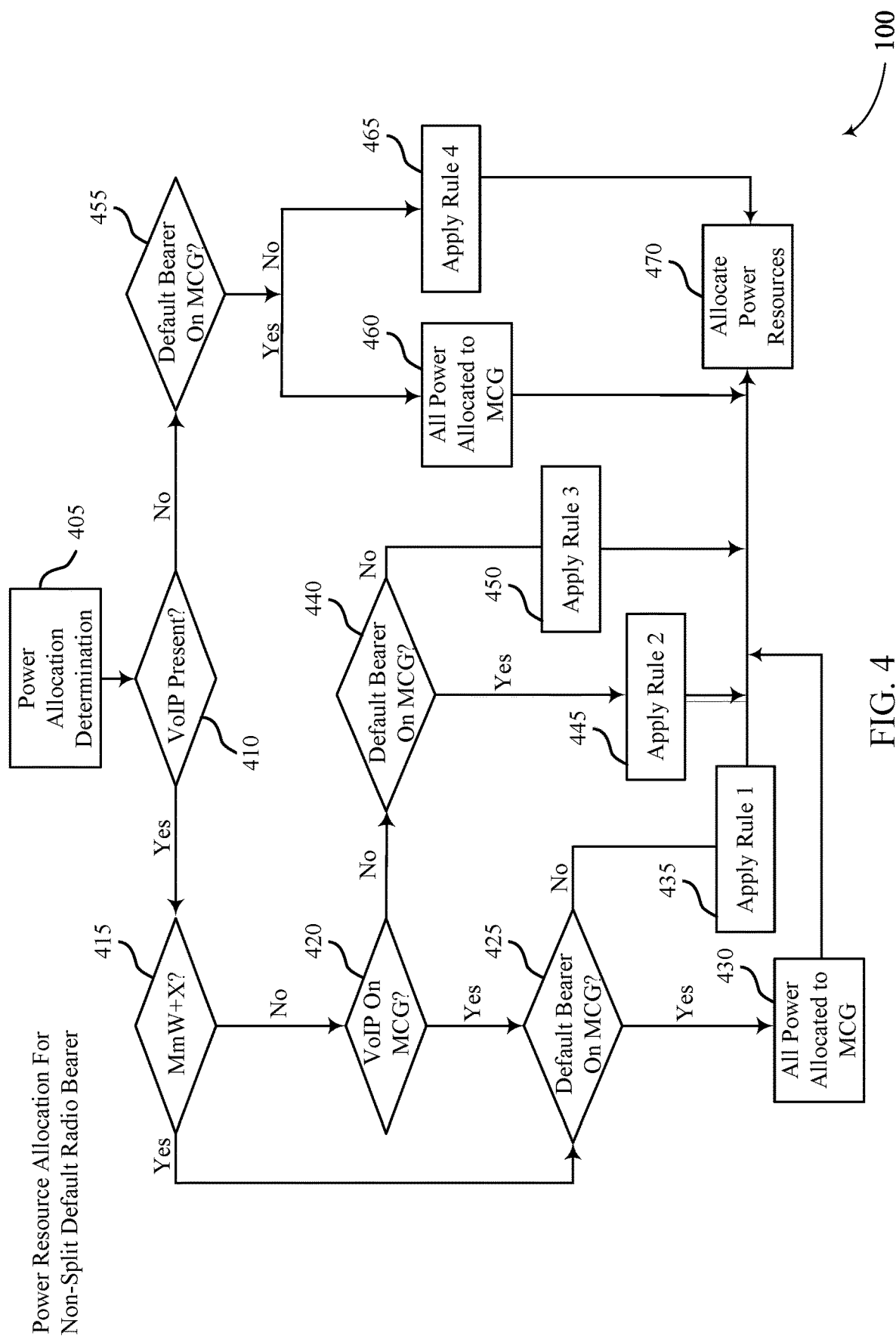
FIG. 4 illustrates an example of a flowchart that supports techniques for transmit power allocation in dual connectivity in accordance with aspects of the present disclosure.

FIG. 4 illustrates an example of a flowchart 400 that supports techniques for transmit power allocation in dual connectivity in accordance with aspects of the present disclosure. In some examples, flowchart 400 may implement, or be implemented by, aspects of wireless communications system 100, wireless communications system 200, process flow 300, or any combination thereof. The key principles of the flow chart include: the bearers configured to operate on a single cell group must use that cell group. The split bearers can be influenced so the traffic is shifting towards one or the other cell. When a bearer carries real-time or QoS data, the UE shall determine its energy needs and meet them first. The remaining energy can be spent in a way that maximizes throughput by influencing the data to the more energy efficient link. FIG. 4 shows a set of decisions that implements these high level principles.

In some examples, the operations illustrated in flowchart 400 may be performed by hardware (e.g., including circuitry, processing blocks, logic components, and other components), code (e.g., software or firmware) executed by a processor, or any combination thereof. In particular, the various steps/operations of the flowchart 400 may be implemented by a UE 115 for allocating power resources across wireless connections in the context of a non-split default radio bearer. Alternative examples of the following may be implemented, where some steps are performed in a different order than described or are not performed at all. In some cases, steps may include additional features not mentioned below, or further steps may be added.

In some implementations, the flowchart 400 may illustrate logic implemented by a UE 115 to allocate power resources across wireless connections in accordance with the rules illustrated in Table 1 above. In this regard, references to "Rule 1, Rule 2, Rule 3, and Rule 4" may be understood to refer to the various rules illustrated in Table 1 above.

At 405, the UE 115 may begin a determination of power resource allocation across multiple wireless connections. The UE 115 may begin the determination at 405 based on establishing a first wireless connection and a second wireless connection in a dual connectivity mode. In particular, the UE 115 may begin the determination of power allocation at 405 based on a default radio bearer at the UE 115 including a non-split default radio bearer.

At 410, the UE 115 may determine whether voice traffic (e.g., VoIP) is present. If voice traffic is present (e.g., Step 410="YES"), the flowchart 400 may proceed to 415. If voice traffic is not present (e.g., Step 410="NO"), the flowchart 400 may proceed to 455. VoIP refers to Voice service, or more generally to any real time service that is important to the end user, might be video telephony or XR/VR services.

At 415, the UE 115 may determine if data traffic transmitted by the UE 115 includes mmW communications (e.g., FR2) and some other form of communications (e.g., FR1, LTE). If mmW traffic is present (e.g., Step 415="YES"), the flowchart 400 may proceed to 425. If mmW traffic is not present (e.g., Step 415="NO"), the flowchart 400 may proceed to 420.

At 420, the UE 115 may determine whether voice traffic (e.g., VoIP) is communicated over the MCG. If voice traffic is communicated over the MCG (e.g., Step 420="YES"), the flowchart 400 may proceed to 425. If voice traffic is not communicated over the MCG (e.g., Step 420="NO"), the flowchart 400 may proceed to 440.

At 425, the UE 115 may determine if the default data bearer at the UE 115 is on the MCG. If the default data bearer is on the MCG (e.g., Step 425="YES"), the flowchart 400 may proceed to 430. If the default data bearer is not on the MCG (e.g., Step 425="NO"), the flowchart 400 may proceed to 435.

At 430, the UE 115 may determine to allocate all power resources to the MCG (e.g., no power resources reserved for SCG). The flowchart 400 may then proceed to step 470, in which the UE 115 allocates all the power resources to the MCG.

At 435, the UE 115 may determine to allocate power resources across the first wireless connection and the second wireless connection in accordance with Rule 1, which is illustrated in Table 1 above. Upon identifying Rule 1, the flowchart 400 may proceed to step 470, in which the UE 115 allocates the power resources in accordance with Rule 1.

At 440, the UE 115 may determine if the default data bearer at the UE 115 is on the MCG. If the default data bearer is on the MCG (e.g., Step 440="YES"), the flowchart 400 may proceed to 445. If the default data bearer is not on the MCG (e.g., Step 440="NO"), the flowchart 400 may proceed to 450.

At 445, the UE 115 may determine to allocate power resources across the first wireless connection and the second wireless connection in accordance with Rule 2, which is illustrated in Table 1 above. Upon identifying Rule 2, the flowchart 400 may proceed to step 470, in which the UE 115 allocates the power resources in accordance with Rule 2.

At 450, the UE 115 may determine to allocate power resources across the first wireless connection and the second wireless connection in accordance with Rule 3, which is illustrated in Table 1 above. Upon identifying Rule 3, the flowchart 400 may proceed to step 470, in which the UE 115 allocates the power resources in accordance with Rule 3.

At 455, the UE 115 may determine if the default data bearer at the UE 115 is on the MCG. If the default data bearer is on the MCG (e.g., Step 455="YES"), the flowchart 400 may proceed to 460. If the default data bearer is not on the MCG (e.g., Step 455="NO"), the flowchart 400 may proceed to 465.

At 460, the UE 115 may determine to allocate all power resources to the MCG (e.g., no power resources reserved for SCG). The flowchart 400 may then proceed to step 470, in which the UE 115 allocates all the power resources to the MCG.

At 465, the UE 115 may determine to allocate power resources across the first wireless connection and the second wireless connection in accordance with Rule 4, which is illustrated in Table 1 above. Upon identifying Rule 4, the flowchart 400 may proceed to step 470, in which the UE 115 allocates the power resources in accordance with Rule 4.

Figure 5:
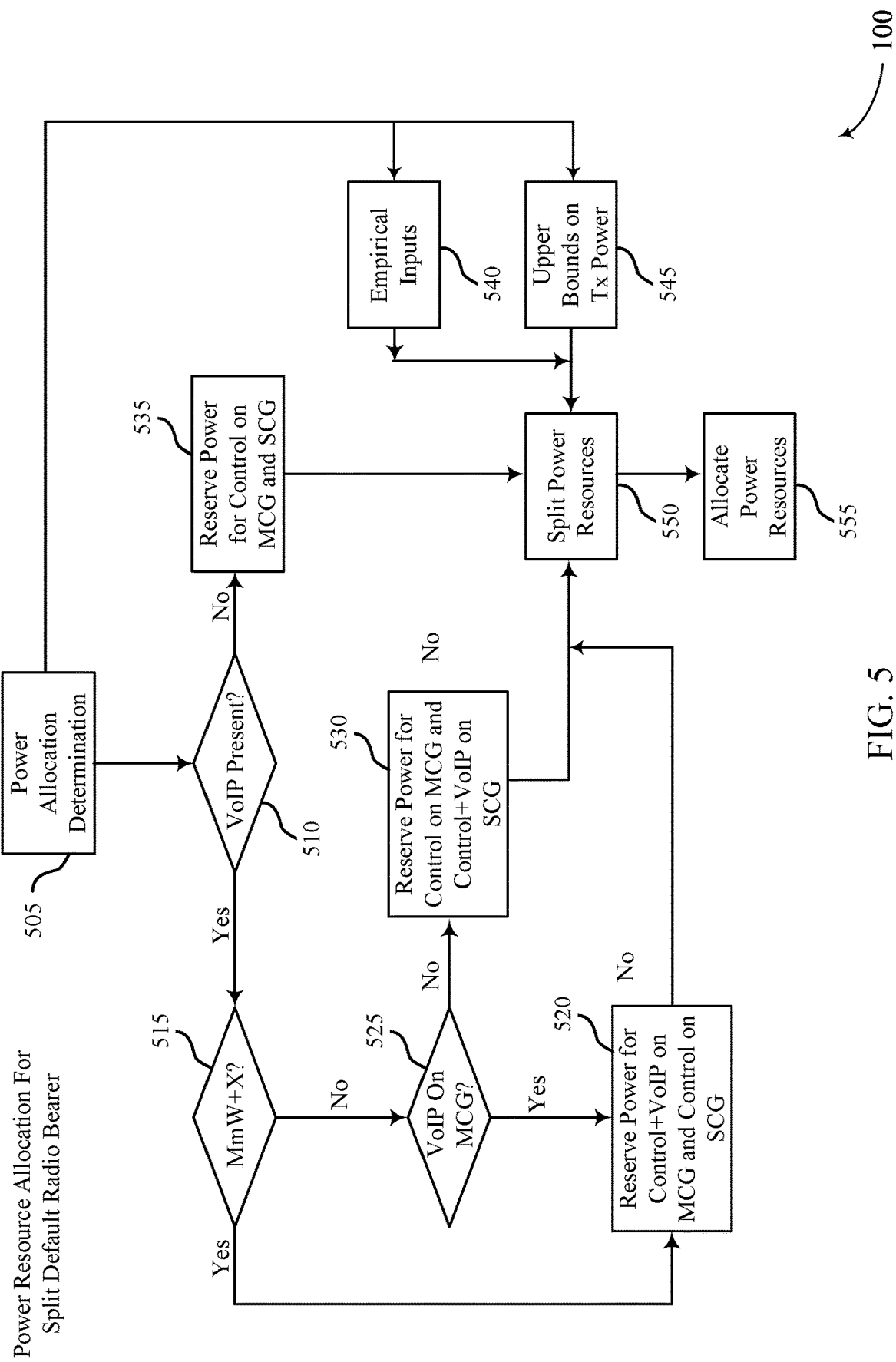
FIG. 5 illustrates an example of a flowchart that supports techniques for transmit power allocation in dual connectivity in accordance with aspects of the present disclosure.

FIG. 5 illustrates an example of a flowchart 500 that supports techniques for transmit power allocation in dual connectivity in accordance with aspects of the present disclosure. In some examples, flowchart 500 may implement, or be implemented by, aspects of wireless communications system 100, wireless communications system 200, process flow 300, or any combination thereof.

In some examples, the operations illustrated in flowchart 500 may be performed by hardware (e.g., including circuitry, processing blocks, logic components, and other components), code (e.g., software or firmware) executed by a processor, or any combination thereof. In particular, the various steps/operations of the flowchart 400 may be implemented by a UE 115 for allocating power resources across wireless connections in the context of a split default radio bearer. Alternative examples of the following may be implemented, where some steps are performed in a different order than described or are not performed at all. In some cases, steps may include additional features not mentioned below, or further steps may be added.

In some implementations, the flowchart 500 may illustrate logic implemented by a UE 115 to allocate power resources across wireless connections in accordance with the rules illustrated in Table 2 above.

At 505, the UE 115 may begin a determination of power resource allocation across multiple wireless connections. The UE 115 may begin the determination at 505 based on establishing a first wireless connection and a second wireless connection in a dual connectivity mode. In particular, the UE 115 may begin the determination of power allocation at 505 based on a default radio bearer at the UE 115 including a split default radio bearer.

At 540, the UE 115 may prepare empirical inputs which will be used for the determination of the power resource allocation across the first wireless connection (e.g., first link) and the second wireless connection (e.g., second link). Empirical inputs may include, but are not limited to, energy efficiency metrics of the respective wireless connections (e.g., energy/byte), a model (e.g., linear fit) between SAR and transmit power, partial discharge (PD) measurements, a model (e.g., linear fit) of PD and transmit power, exponential smoothing of bandwidth per scheduled TTI, SAR measurements, power samples for the respective wireless connections, or any combination thereof.

At 545, the UE 115 may determine upper bounds (e.g., maximum power resource threshold) on the transmit power for each of the first wireless connection and the second wireless connection. Upper bounds on the transmit power for each wireless connection may be based on target SNRs for highest supported MCSs, power classes, or other parameters for the respective wireless connections. These upper bounds may be used later within the flowchart 500 for allocating power resources.

At 510, the UE 115 may determine whether voice traffic (e.g., VoIP) is present. If voice traffic is present (e.g., Step 510="YES"), the flowchart 500 may proceed to 515. If voice traffic is not present (e.g., Step 510="NO"), the flowchart 400 may proceed to 535.

At 515, the UE 115 may determine if data traffic transmitted by the UE 115 includes mmW communications (e.g., FR2) and some other form of communications (e.g., FR1, LTE). If mmW traffic is present (e.g., Step 515="YES"), the flowchart 500 may proceed to 520. If mmW traffic is not present (e.g., Step 515="NO"), the flowchart 500 may proceed to 525.

At 520, the UE 115 may determine to reserve power resources for control and voice traffic (e.g., VoIP) on the MCG, and to reserve power resources for control traffic on the SCG.

At 525, the UE 115 may determine whether voice traffic (e.g., VoIP) is communicated over the MCG. If voice traffic is communicated over the MCG (e.g., Step 525="YES"), the flowchart 500 may proceed to 520, as described above. If voice traffic is not communicated over the MCG (e.g., Step 525="NO"), the flowchart 500 may proceed to 530.

At 530, the UE 115 may determine to reserve power resources for control traffic on the MCG, and to reserve power resources for control and voice traffic (e.g., VoIP) on the SCG.

At 535, the UE 115 may determine to reserve power resources for control traffic on the MCG and the SCG.

At 550, the UE 115 may determine the split (e.g., allocation) of power resources across the first and second wireless connections (e.g., MCG, SCG) in accordance with the determinations made at 520, 530, and 535. Additionally, the UE 115 may determine the allocation of power resources across the respective wireless connections based on the empirical results determined at 540, the upper bounds for transmit power on the respective wireless connections at 545, or both.

At 555, the UE 115 may allocate the power resources across the respective wireless connections in accordance with the determined power resource allocations.

Figure 6:
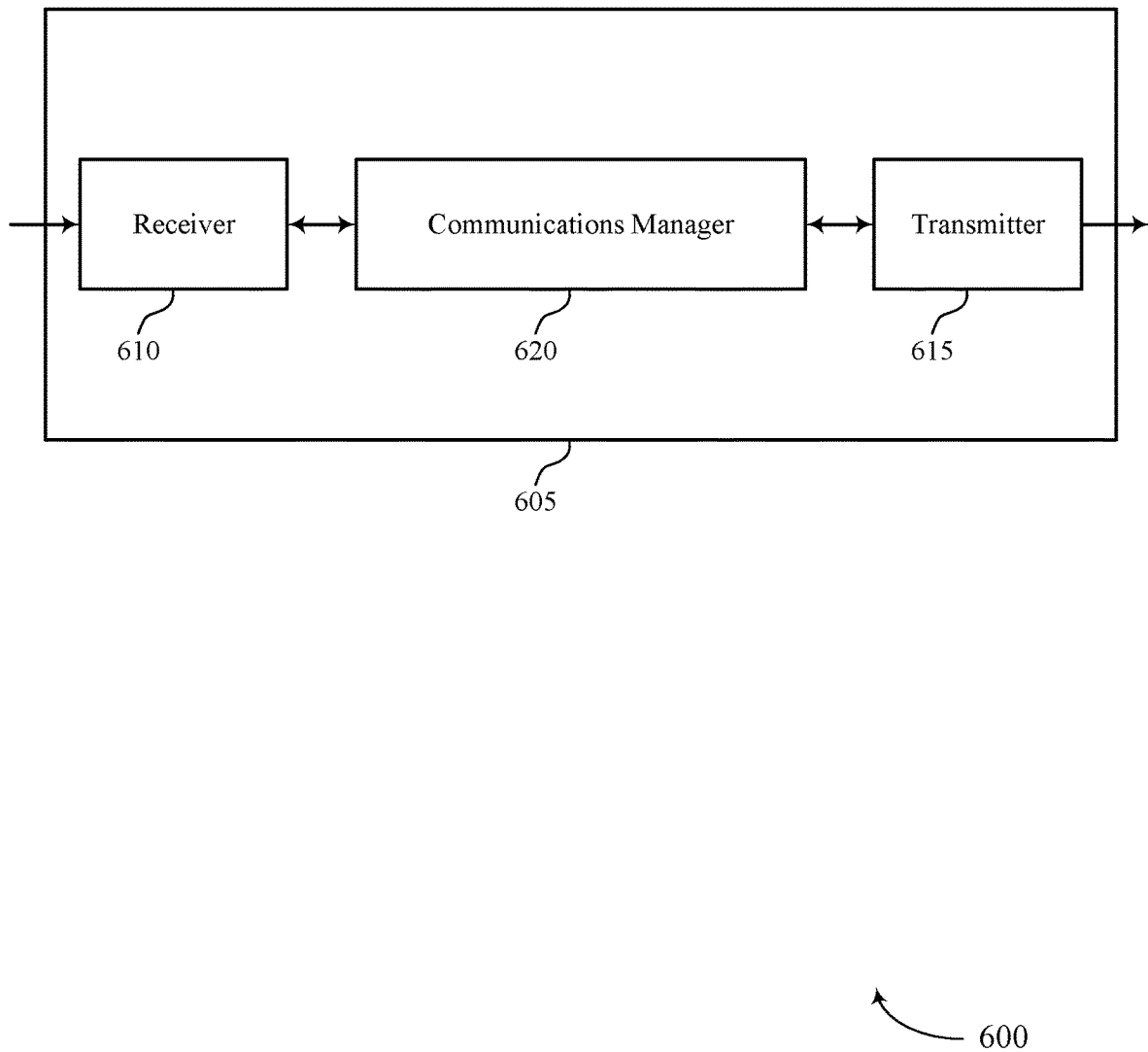
FIGS. 6 and 7 show block diagrams of devices that support techniques for transmit power allocation in dual connectivity in accordance with aspects of the present disclosure.

FIG. 6 shows a block diagram 600 of a device 605 that supports techniques for transmit power allocation in dual connectivity in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for transmit power allocation in dual connectivity). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for transmit power allocation in dual connectivity). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for transmit power allocation in dual connectivity as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for establishing a first wireless connection with a first wireless device. The communications manager 620 may be configured as or otherwise support a means for establishing a second wireless connection with the first wireless device or a second wireless device, where the first wireless connection and the second wireless connection operate in a dual connectivity mode. The communications manager 620 may be configured as or otherwise support a means for identifying a first energy efficiency metric associated with the first wireless connection and a second energy efficiency metric associated with the second wireless connection. The communications manager 620 may be configured as or otherwise support a means for identifying one or more parameters associated with a transmit power of communications at the UE. The communications manager 620 may be configured as or otherwise support a means for comparing the first energy efficiency metric and the second energy efficiency metric. The communications manager 620 may be configured as or otherwise support a means for allocating a first power resource to the first wireless connection, a second power resource to the second wireless connection, or both, based on the comparison, the one or more parameters, or a combination thereof.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for allocating power resources across multiple wireless connections. In particular, by allocating transmit power across wireless connections based on a relative energy efficiency of the respective wireless connections, techniques described herein may enable a UE 115 to increase (e.g., maximize) data throughput at the UE 115 across the respective wireless connections while sustaining non-throttleable traffic and ensuring compliance with applicable regulatory constraints. Accordingly, aspects of the present disclosure may improve data throughput within the wireless communications system, limit radiation exposure to human tissue, and increase the effectiveness and widespread use of dual connectivity.

Figure 7:
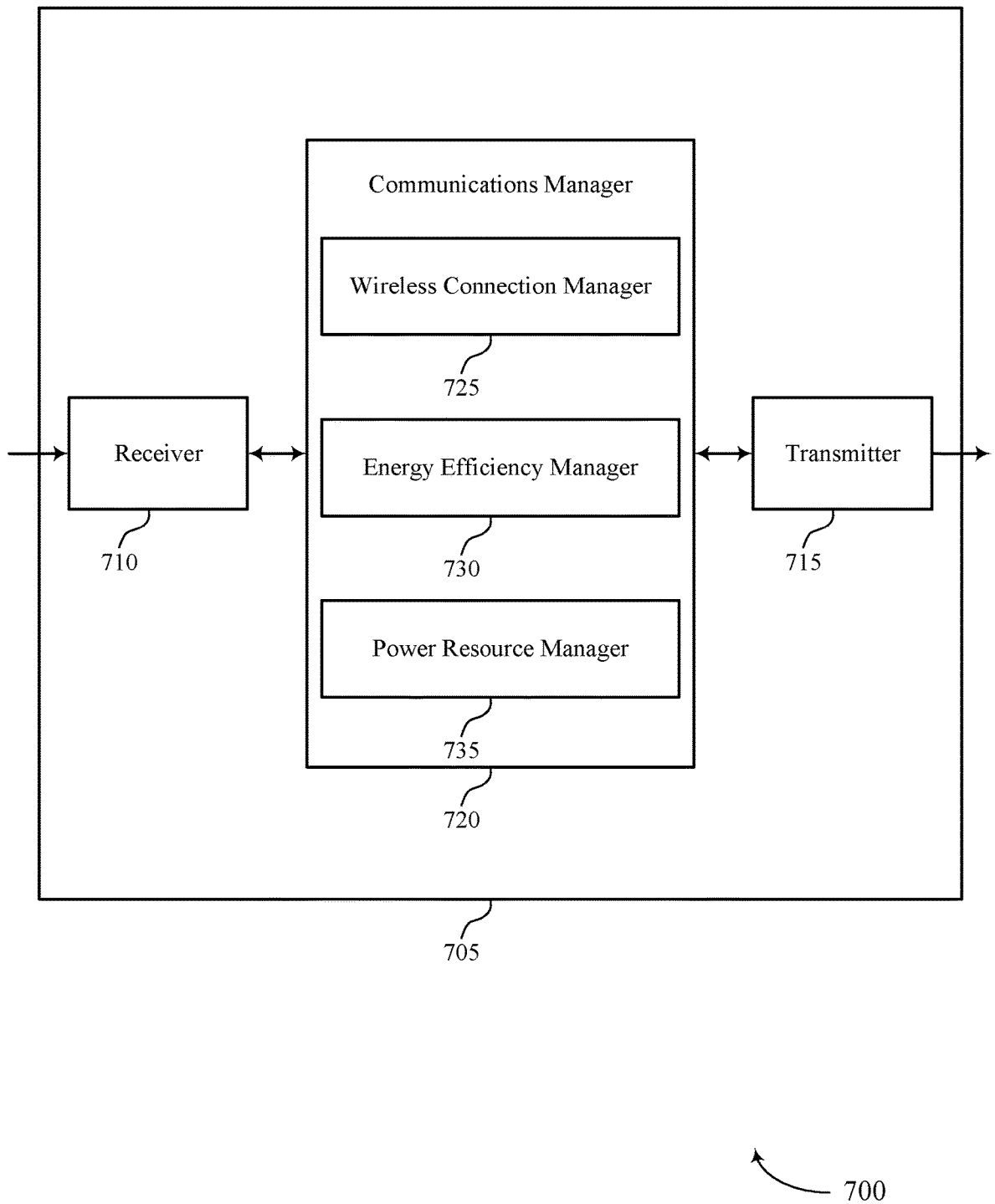

FIG. 7 shows a block diagram 700 of a device 705 that supports techniques for transmit power allocation in dual connectivity in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for transmit power allocation in dual connectivity). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for transmit power allocation in dual connectivity). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for transmit power allocation in dual connectivity as described herein. For example, the communications manager 720 may include a wireless connection manager 725, an energy efficiency manager 730, a power resource manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The wireless connection manager 725 may be configured as or otherwise support a means for establishing a first wireless connection with a first wireless device. The wireless connection manager 725 may be configured as or otherwise support a means for establishing a second wireless connection with the first wireless device or a second wireless device, where the first wireless connection and the second wireless connection operate in a dual connectivity mode. The energy efficiency manager 730 may be configured as or otherwise support a means for identifying a first energy efficiency metric associated with the first wireless connection and a second energy efficiency metric associated with the second wireless connection. The power resource manager 735 may be configured as or otherwise support a means for identifying one or more parameters associated with a transmit power of communications at the UE. The energy efficiency manager 730 may be configured as or otherwise support a means for comparing the first energy efficiency metric and the second energy efficiency metric. The power resource manager 735 may be configured as or otherwise support a means for allocating a first power resource to the first wireless connection, a second power resource to the second wireless connection, or both, based on the comparison, the one or more parameters, or a combination thereof.

Figure 8:
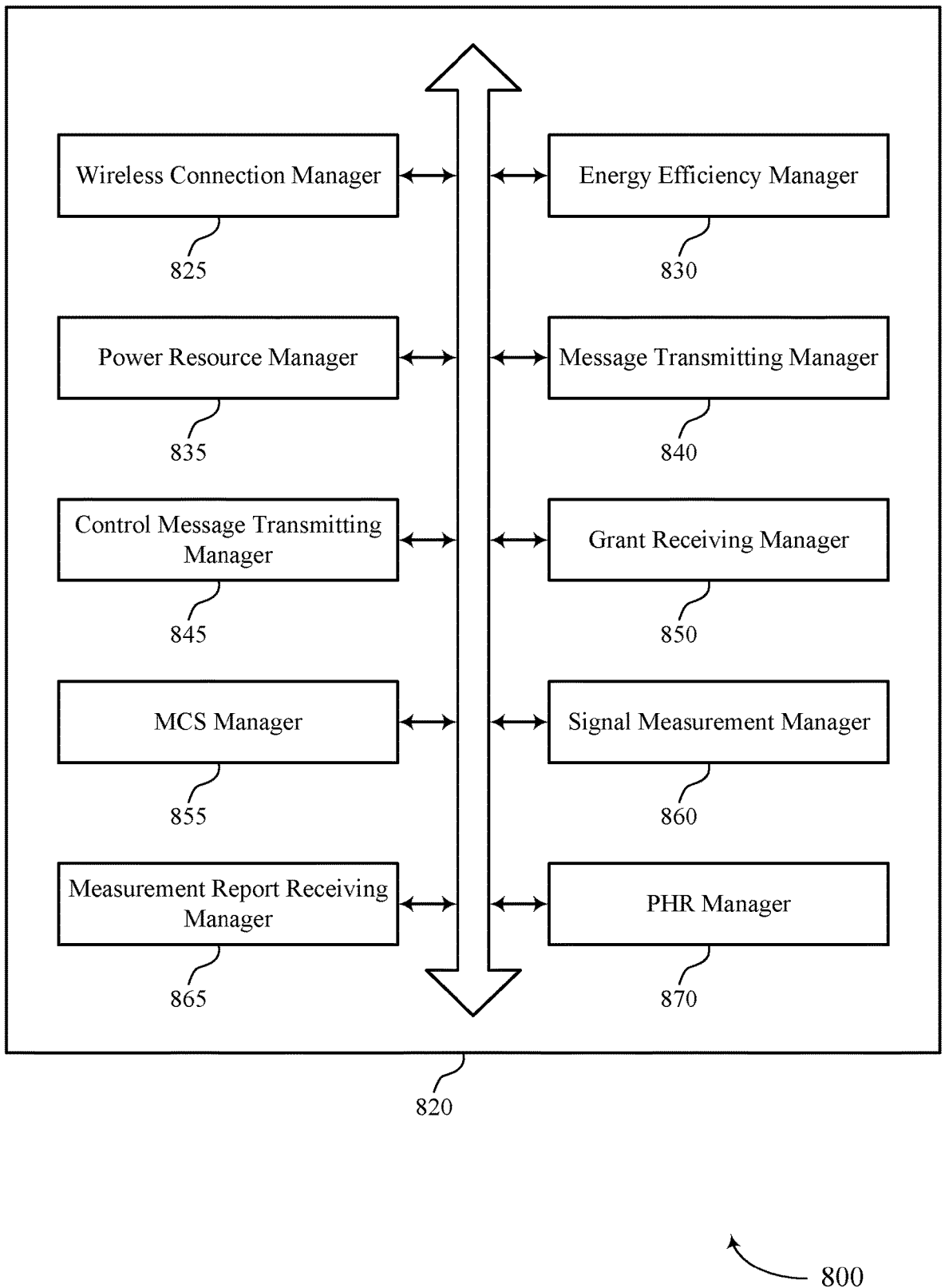
FIG. 8 shows a block diagram of a communications manager that supports techniques for transmit power allocation in dual connectivity in accordance with aspects of the present disclosure.

FIG. 8 shows a block diagram 800 of a communications manager 820 that supports techniques for transmit power allocation in dual connectivity in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for transmit power allocation in dual connectivity as described herein. For example, the communications manager 820 may include a wireless connection manager 825, an energy efficiency manager 830, a power resource manager 835, a message transmitting manager 840, a control message transmitting manager 845, a grant receiving manager 850, an MCS manager 855, a signal measurement manager 860, a measurement report receiving manager 865, an PHR manager 870, or any combination thereof. Each of these components may communicate, directly or indirectly, with one another (e.g., via one or more buses).

The communications manager 820 may support wireless communication at a UE in accordance with examples as disclosed herein. The wireless connection manager 825 may be configured as or otherwise support a means for establishing a first wireless connection with a first wireless device. In some examples, the wireless connection manager 825 may be configured as or otherwise support a means for establishing a second wireless connection with the first wireless device or a second wireless device, where the first wireless connection and the second wireless connection operate in a dual connectivity mode. The energy efficiency manager 830 may be configured as or otherwise support a means for identifying a first energy efficiency metric associated with the first wireless connection and a second energy efficiency metric associated with the second wireless connection. The power resource manager 835 may be configured as or otherwise support a means for identifying one or more parameters associated with a transmit power of communications at the UE. In some examples, the energy efficiency manager 830 may be configured as or otherwise support a means for comparing the first energy efficiency metric and the second energy efficiency metric. In some examples, the power resource manager 835 may be configured as or otherwise support a means for allocating a first power resource to the first wireless connection, a second power resource to the second wireless connection, or both, based on the comparison, the one or more parameters, or a combination thereof.

In some examples, the message transmitting manager 840 may be configured as or otherwise support a means for transmitting a first message to the first wireless device via the first wireless connection based on the first power resource. In some examples, the message transmitting manager 840 may be configured as or otherwise support a means for transmitting a second message to the first wireless device or the second wireless device via the second wireless connection based on the second power resource.

In some examples, the control message transmitting manager 845 may be configured as or otherwise support a means for transmitting a control message indicating a first set of one or more characteristics associated with wireless communications at the UE based on the first power resource, the second power resource, or a combination thereof. In some examples, the grant receiving manager 850 may be configured as or otherwise support a means for receiving, from the first wireless device, the second wireless device, or both, a grant scheduling one or more messages to be transmitted by the UE, where the grant is based on the first set of one or more characteristics.

In some examples, the PHR manager 870 may be configured as or otherwise support a means for identifying an available PHR, a message buffer queue, or both, associated with the UE based on the first power resource, the second power resource, the one or more parameters, or any combination thereof. In some examples, the PHR manager 870 may be configured as or otherwise support a means for selectively adjusting at least one of the available PHR or the message buffer queue to generate an adjusted available PHR, an adjusted message buffer queue, or both, where the first set of one or more characteristics include the adjusted available PHR, the adjusted message buffer queue, or both.

In some examples, to support allocating the first power resource and the second power resource, the power resource manager 835 may be configured as or otherwise support a means for allocating the first power resource and the second power resource based on an aggregate data throughput associated with the first wireless connection and the second wireless connection satisfying a threshold data throughput.

In some examples, to support allocating the first power resource and the second power resource, the power resource manager 835 may be configured as or otherwise support a means for allocating the first power resource and the second power resource based on an absence of voice traffic at the UE, or whether voice traffic at the UE is communicated via the first wireless connection, the second wireless connection, or a combination thereof.

In some examples, to support allocating the first power resource and the second power resource, the power resource manager 835 may be configured as or otherwise support a means for allocating the first power resource and the second power resource based on whether the first wireless connection is associated with a default radio bearer. In some examples, to support allocating the first power resource and the second power resource, the power resource manager 835 may be configured as or otherwise support a means for allocating the first power resource and the second power resource is based on whether internet traffic at the UE is communicated via the first wireless connection, the second wireless connection, or both.

In some examples, to support allocating the first power resource and the second power resource, the power resource manager 835 may be configured as or otherwise support a means for allocating the first power resource and the second power resource is based on a configuration of a first DRB associated with the first wireless connection, a second DRB associated with the second wireless connection, or both. In some examples, the configuration of the first DRB, the second DRB, or both, includes a split radio bearer configuration, a non-split radio bearer configuration, or both.

In some examples, the MCS manager 855 may be configured as or otherwise support a means for identifying a first MCS associated with the first wireless connection and a second MCS associated with the second wireless connection, where identifying the first energy efficiency metric and the second energy efficiency metric is based on the first MCS, the second MCS, or a combination thereof.

In some examples, the signal measurement manager 860 may be configured as or otherwise support a means for performing a first set of measurements on a first message received via the first wireless connection. In some examples, the signal measurement manager 860 may be configured as or otherwise support a means for performing a second set of measurements on a second message received via the second wireless connection, where identifying the first energy efficiency metric and the second energy efficiency metric is based on the first set of measurements, the second set of measurements, or a combination thereof.

In some examples, the measurement report receiving manager 865 may be configured as or otherwise support a means for receiving a first measurement report associated with communications performed via the first wireless connection. In some examples, the measurement report receiving manager 865 may be configured as or otherwise support a means for receiving a second measurement report associated with communications performed via the second wireless connection, where identifying the first energy efficiency metric and the second energy efficiency metric is based on the first measurement report, the second measurement report, or a combination thereof.

In some examples, the one or more parameters include a SAR, an MPE, or both. In some examples, the first wireless connection includes a wireless connection for an MCG. In some examples, the second wireless connection includes a wireless connection for an SCG. In some examples, the first wireless connection and the second wireless connection are associated with a same RAT. In some examples, the first wireless connection is associated with a first RAT, and the second wireless connection is associated with a second RAT different from the first RAT.

In some examples, to support allocating the first transmit power and the second transmit power, the power resource manager 835 may be configured as or otherwise support a means for allocating the first power resource based on a first minimum power resource threshold and a first maximum power resource threshold associated with the first wireless connection. In some examples, to support allocating the first transmit power and the second transmit power, the power resource manager 835 may be configured as or otherwise support a means for allocating the second power resource based on a second minimum power resource threshold and a second maximum power resource threshold associated with the second wireless connection. In some examples, the first power resource, the second power resource, or both, includes an instantaneous transmit power, a transmit power over a time interval, or both.

Figure 9:
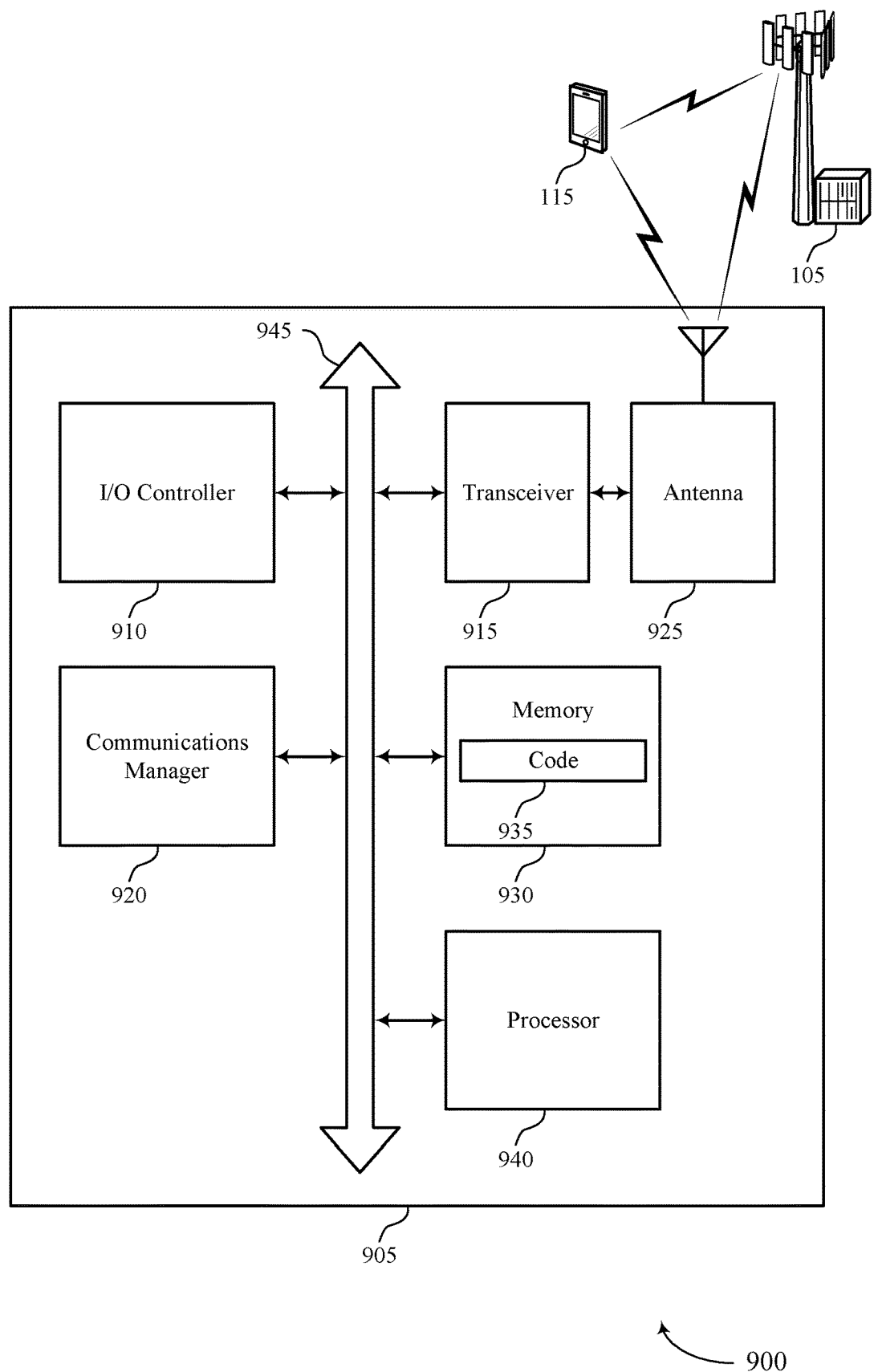
FIG. 9 shows a diagram of a system including a device that supports techniques for transmit power allocation in dual connectivity in accordance with aspects of the present disclosure.

FIG. 9 shows a diagram of a system 900 including a device 905 that supports techniques for transmit power allocation in dual connectivity in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for transmit power allocation in dual connectivity). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for establishing a first wireless connection with a first wireless device. The communications manager 920 may be configured as or otherwise support a means for establishing a second wireless connection with the first wireless device or a second wireless device, where the first wireless connection and the second wireless connection operate in a dual connectivity mode. The communications manager 920 may be configured as or otherwise support a means for identifying a first energy efficiency metric associated with the first wireless connection and a second energy efficiency metric associated with the second wireless connection. The communications manager 920 may be configured as or otherwise support a means for identifying one or more parameters associated with a transmit power of communications at the UE. The communications manager 920 may be configured as or otherwise support a means for comparing the first energy efficiency metric and the second energy efficiency metric. The communications manager 920 may be configured as or otherwise support a means for allocating a first power resource to the first wireless connection, a second power resource to the second wireless connection, or both, based on the comparison, the one or more parameters, or a combination thereof.

By including or configuring the communications manager 920 in accordance with examples as described herein, the device 905 may support techniques for allocating power resources across multiple wireless connections. In particular, by allocating transmit power across wireless connections based on a relative energy efficiency of the respective wireless connections, techniques described herein may enable a UE 115 to increase (e.g., maximize) data throughput at the UE 115 across the respective wireless connections while sustaining non-throttleable traffic and ensuring compliance with applicable regulatory constraints. Accordingly, aspects of the present disclosure may improve data throughput within the wireless communications system, limit radiation exposure to human tissue, and increase the effectiveness and widespread use of dual connectivity.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for transmit power allocation in dual connectivity as described herein, or the processor 940 and the memory 930 may be otherwise configured to perform or support such operations.

Figure 10:
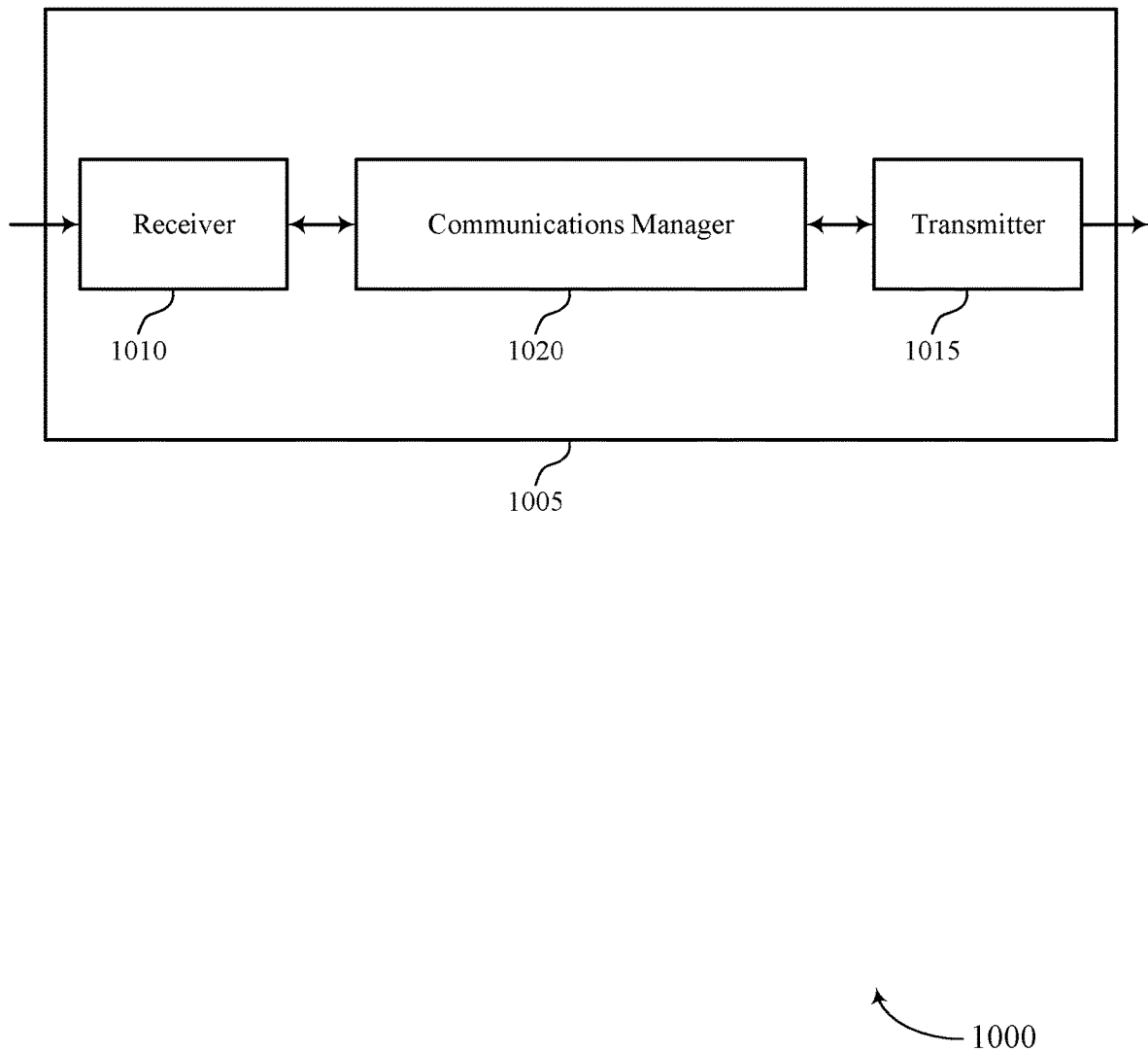
FIGS. 10 and 11 show block diagrams of devices that support techniques for transmit power allocation in dual connectivity in accordance with aspects of the present disclosure.

FIG. 10 shows a block diagram 1000 of a device 1005 that supports techniques for transmit power allocation in dual connectivity in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for transmit power allocation in dual connectivity). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for transmit power allocation in dual connectivity). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for transmit power allocation in dual connectivity as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for establishing a first wireless connection with a UE based on the UE operating in accordance with a dual connectivity mode. The communications manager 1020 may be configured as or otherwise support a means for receiving, from the UE via the first wireless connection, a control message indicating a set of one or more characteristics associated with wireless communications at the UE based on a first power resource allocated to the first wireless connection at the UE, a second power resource allocated to a second wireless connection at the UE, or a combination thereof. The communications manager 1020 may be configured as or otherwise support a means for transmitting, to the UE via the first wireless connection, a grant scheduling one or more messages to be transmitted by the UE via the first wireless connection, the second wireless connection, or both, where the grant is based on the set of one or more characteristics.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for allocating power resources across multiple wireless connections. In particular, by allocating transmit power across wireless connections based on a relative energy efficiency of the respective wireless connections, techniques described herein may enable a UE 115 to increase (e.g., maximize) data throughput at the UE 115 across the respective wireless connections while sustaining non-throttleable traffic and ensuring compliance with applicable regulatory constraints. Accordingly, aspects of the present disclosure may improve data throughput within the wireless communications system, limit radiation exposure to human tissue, and increase the effectiveness and widespread use of dual connectivity.

Figure 11:
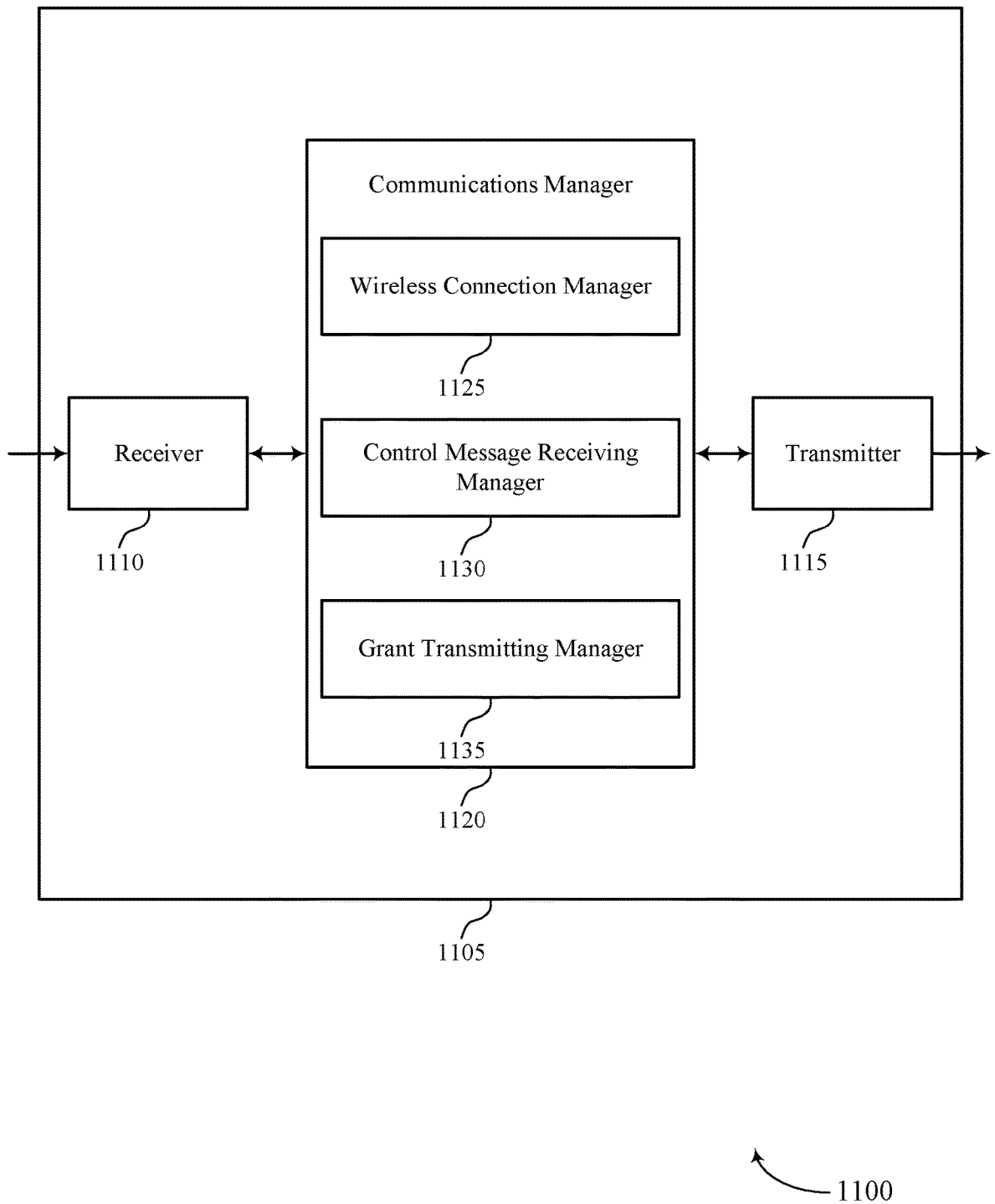

FIG. 11 shows a block diagram 1100 of a device 1105 that supports techniques for transmit power allocation in dual connectivity in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for transmit power allocation in dual connectivity). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for transmit power allocation in dual connectivity). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for transmit power allocation in dual connectivity as described herein. For example, the communications manager 1120 may include a wireless connection manager 1125, a control message receiving manager 1130, a grant transmitting manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The wireless connection manager 1125 may be configured as or otherwise support a means for establishing a first wireless connection with a UE based on the UE operating in accordance with a dual connectivity mode. The control message receiving manager 1130 may be configured as or otherwise support a means for receiving, from the UE via the first wireless connection, a control message indicating a set of one or more characteristics associated with wireless communications at the UE based on a first power resource allocated to the first wireless connection at the UE, a second power resource allocated to a second wireless connection at the UE, or a combination thereof. The grant transmitting manager 1135 may be configured as or otherwise support a means for transmitting, to the UE via the first wireless connection, a grant scheduling one or more messages to be transmitted by the UE via the first wireless connection, the second wireless connection, or both, where the grant is based on the set of one or more characteristics.

Figure 12:
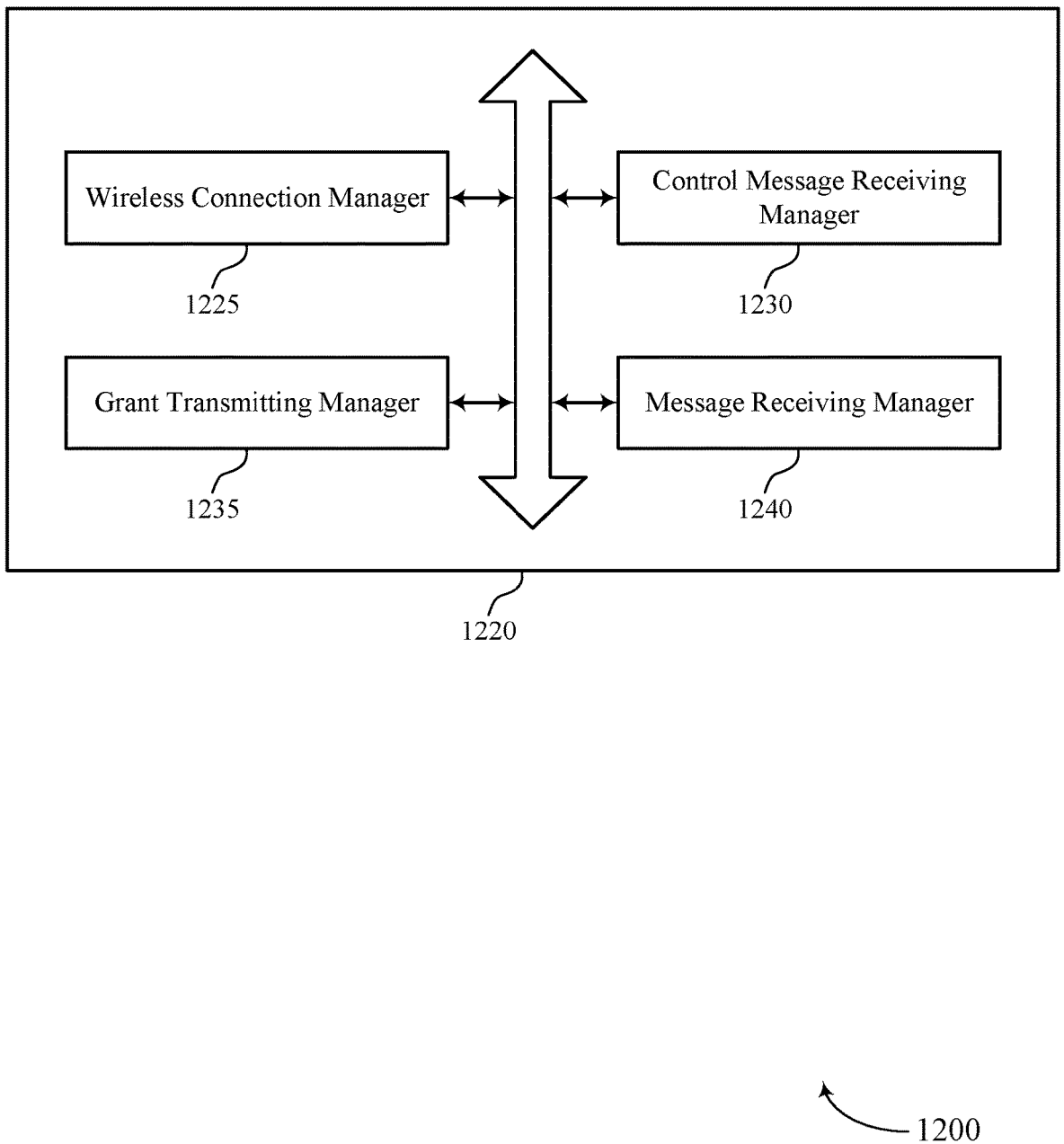
FIG. 12 shows a block diagram of a communications manager that supports techniques for transmit power allocation in dual connectivity in accordance with aspects of the present disclosure.

FIG. 12 shows a block diagram 1200 of a communications manager 1220 that supports techniques for transmit power allocation in dual connectivity in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for transmit power allocation in dual connectivity as described herein. For example, the communications manager 1220 may include a wireless connection manager 1225, a control message receiving manager 1230, a grant transmitting manager 1235, a message receiving manager 1240, or any combination thereof. Each of these components may communicate, directly or indirectly, with one another (e.g., via one or more buses).

The communications manager 1220 may support wireless communication at a base station in accordance with examples as disclosed herein. The wireless connection manager 1225 may be configured as or otherwise support a means for establishing a first wireless connection with a UE based on the UE operating in accordance with a dual connectivity mode. The control message receiving manager 1230 may be configured as or otherwise support a means for receiving, from the UE via the first wireless connection, a control message indicating a set of one or more characteristics associated with wireless communications at the UE based on a first power resource allocated to the first wireless connection at the UE, a second power resource allocated to a second wireless connection at the UE, or a combination thereof. The grant transmitting manager 1235 may be configured as or otherwise support a means for transmitting, to the UE via the first wireless connection, a grant scheduling one or more messages to be transmitted by the UE via the first wireless connection, the second wireless connection, or both, where the grant is based on the set of one or more characteristics.

In some examples, the wireless connection manager 1225 may be configured as or otherwise support a means for establishing the second wireless connection with the UE, where the first wireless connection and the second wireless connection operate in the dual connectivity mode at the UE. In some examples, the message receiving manager 1240 may be configured as or otherwise support a means for receiving, a first message from the UE via the first wireless connection based on the grant and the first power resource. In some examples, the message receiving manager 1240 may be configured as or otherwise support a means for receiving a second message from the UE via the second wireless connection based on the grant and the second power resource.

In some examples, the set of one or more characteristics include an available PHR at the UE, a message buffer queue at the UE, or both. In some examples, the first wireless connection includes a wireless connection for an MCG. In some examples, the second wireless connection includes a wireless connection for an SCG.

Figure 13:
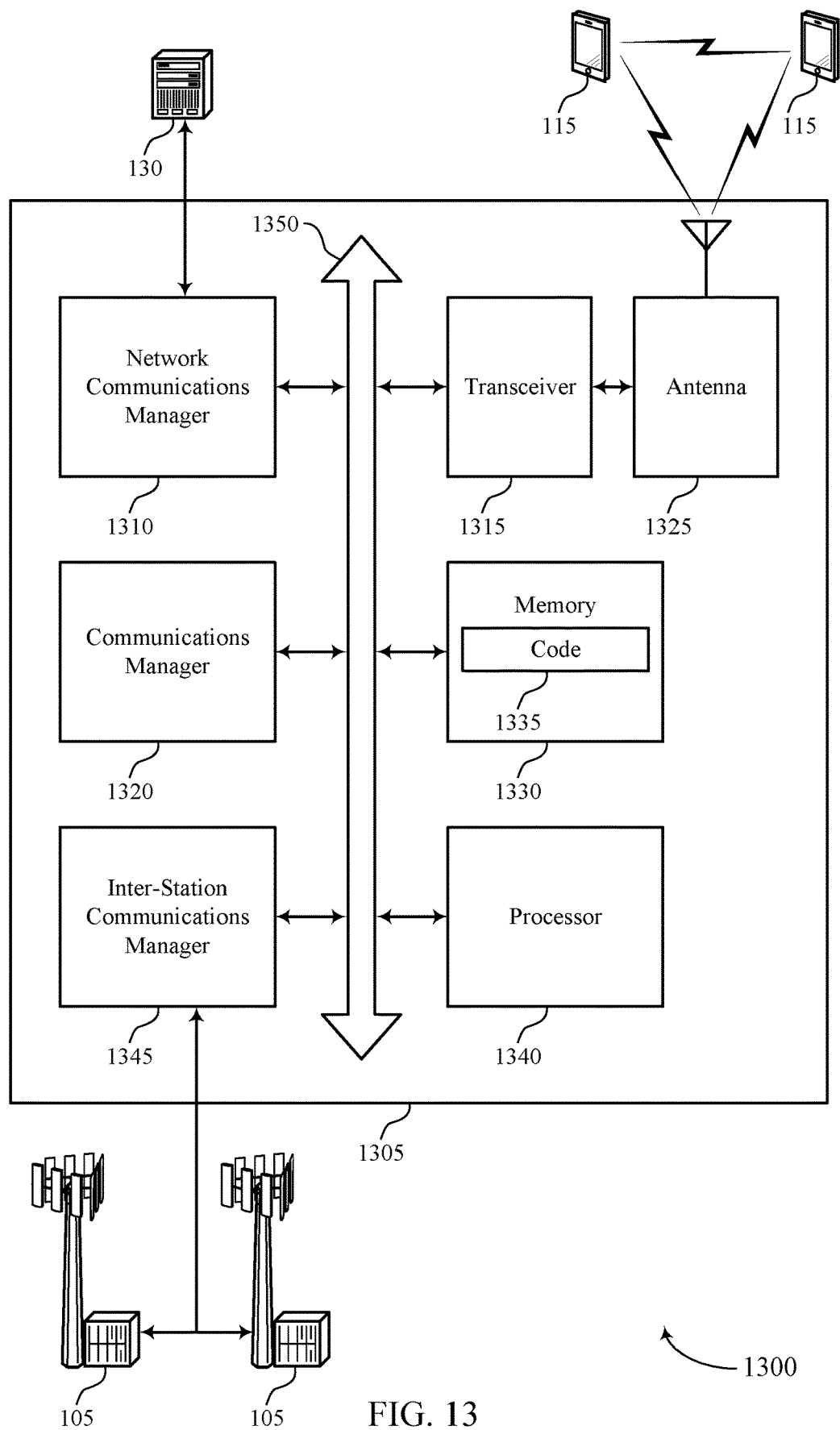
FIG. 13 shows a diagram of a system including a device that supports techniques for transmit power allocation in dual connectivity in accordance with aspects of the present disclosure.

FIG. 13 shows a diagram of a system 1300 including a device 1305 that supports techniques for transmit power allocation in dual connectivity in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for transmit power allocation in dual connectivity). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for establishing a first wireless connection with a UE based on the UE operating in accordance with a dual connectivity mode. The communications manager 1320 may be configured as or otherwise support a means for receiving, from the UE via the first wireless connection, a control message indicating a set of one or more characteristics associated with wireless communications at the UE based on a first power resource allocated to the first wireless connection at the UE, a second power resource allocated to a second wireless connection at the UE, or a combination thereof. The communications manager 1320 may be configured as or otherwise support a means for transmitting, to the UE via the first wireless connection, a grant scheduling one or more messages to be transmitted by the UE via the first wireless connection, the second wireless connection, or both, where the grant is based on the set of one or more characteristics.

By including or configuring the communications manager 1320 in accordance with examples as described herein, the device 1305 may support techniques for allocating power resources across multiple wireless connections. In particular, by allocating transmit power across wireless connections based on a relative energy efficiency of the respective wireless connections, techniques described herein may enable a UE 115 to increase (e.g., maximize) data throughput at the UE 115 across the respective wireless connections while sustaining non-throttleable traffic and ensuring compliance with applicable regulatory constraints. Accordingly, aspects of the present disclosure may improve data throughput within the wireless communications system, limit radiation exposure to human tissue, and increase the effectiveness and widespread use of dual connectivity.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for transmit power allocation in dual connectivity as described herein, or the processor 1340 and the memory 1330 may be otherwise configured to perform or support such operations.

Figure 14:
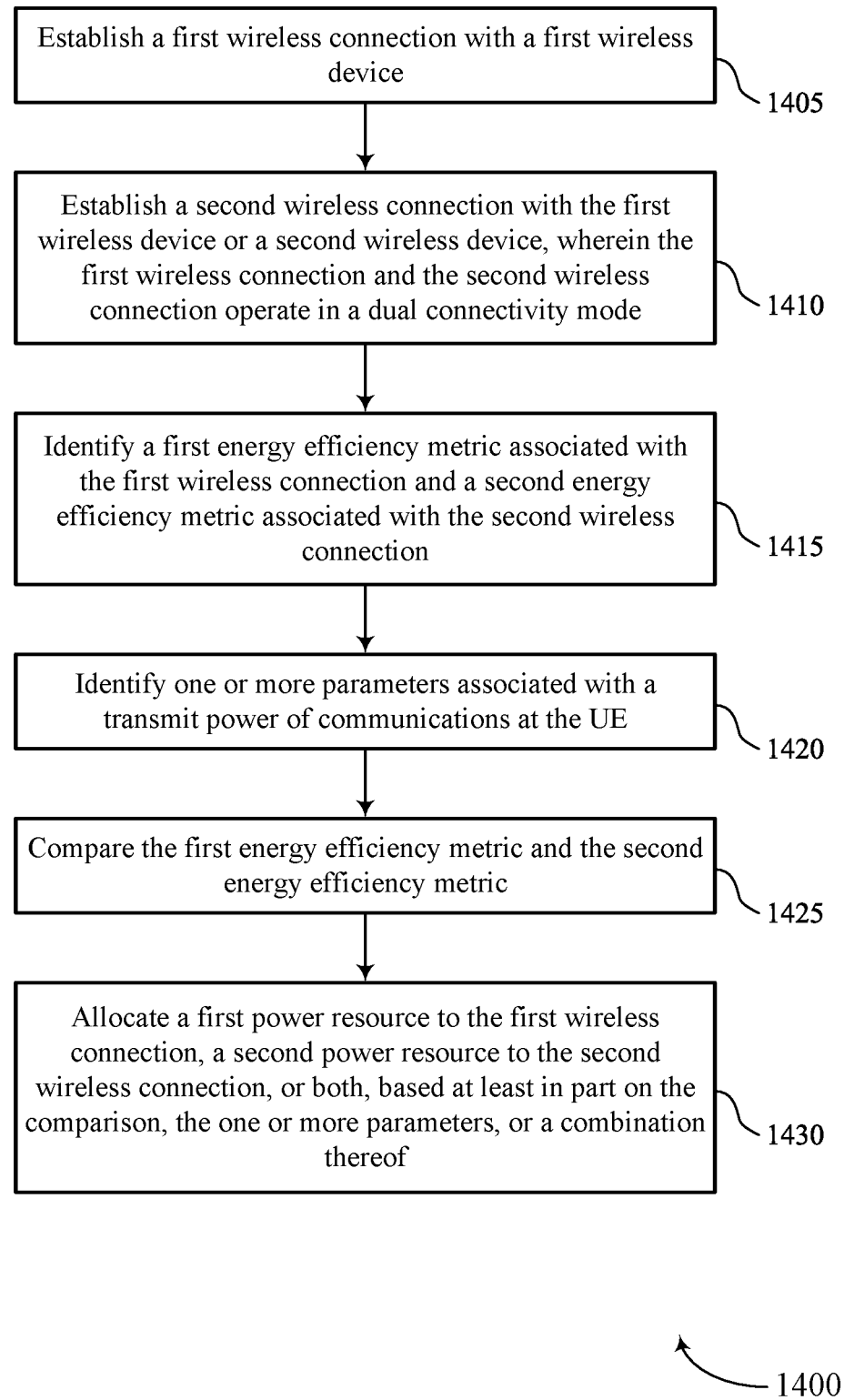
FIGS. 14 through 17 show flowcharts illustrating methods that support techniques for transmit power allocation in dual connectivity in accordance with aspects of the present disclosure.

FIG. 14 shows a flowchart illustrating a method 1400 that supports techniques for transmit power allocation in dual connectivity in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include establishing a first wireless connection with a first wireless device. The operations of 1405 may be performed in accordance with examples as disclosed herein. In some examples, aspects of the operations of 1405 may be performed by a wireless connection manager 825 as described with reference to FIG. 8.

At 1410, the method may include establishing a second wireless connection with the first wireless device or a second wireless device, where the first wireless connection and the second wireless connection operate in a dual connectivity mode. The operations of 1410 may be performed in accordance with examples as disclosed herein. In some examples, aspects of the operations of 1410 may be performed by a wireless connection manager 825 as described with reference to FIG. 8.

At 1415, the method may include identifying a first energy efficiency metric associated with the first wireless connection and a second energy efficiency metric associated with the second wireless connection. The operations of 1415 may be performed in accordance with examples as disclosed herein. In some examples, aspects of the operations of 1415 may be performed by an energy efficiency manager 830 as described with reference to FIG. 8.

At 1420, the method may include identifying one or more parameters associated with a transmit power of communications at the UE. The operations of 1420 may be performed in accordance with examples as disclosed herein. In some examples, aspects of the operations of 1420 may be performed by a power resource manager 835 as described with reference to FIG. 8.

At 1425, the method may include comparing the first energy efficiency metric and the second energy efficiency metric. The operations of 1425 may be performed in accordance with examples as disclosed herein. In some examples, aspects of the operations of 1425 may be performed by an energy efficiency manager 830 as described with reference to FIG. 8.

At 1430, the method may include allocating a first power resource to the first wireless connection, a second power resource to the second wireless connection, or both, based on the comparison, the one or more parameters, or a combination thereof. The operations of 1430 may be performed in accordance with examples as disclosed herein. In some examples, aspects of the operations of 1430 may be performed by a power resource manager 835 as described with reference to FIG. 8.

Figure 15:
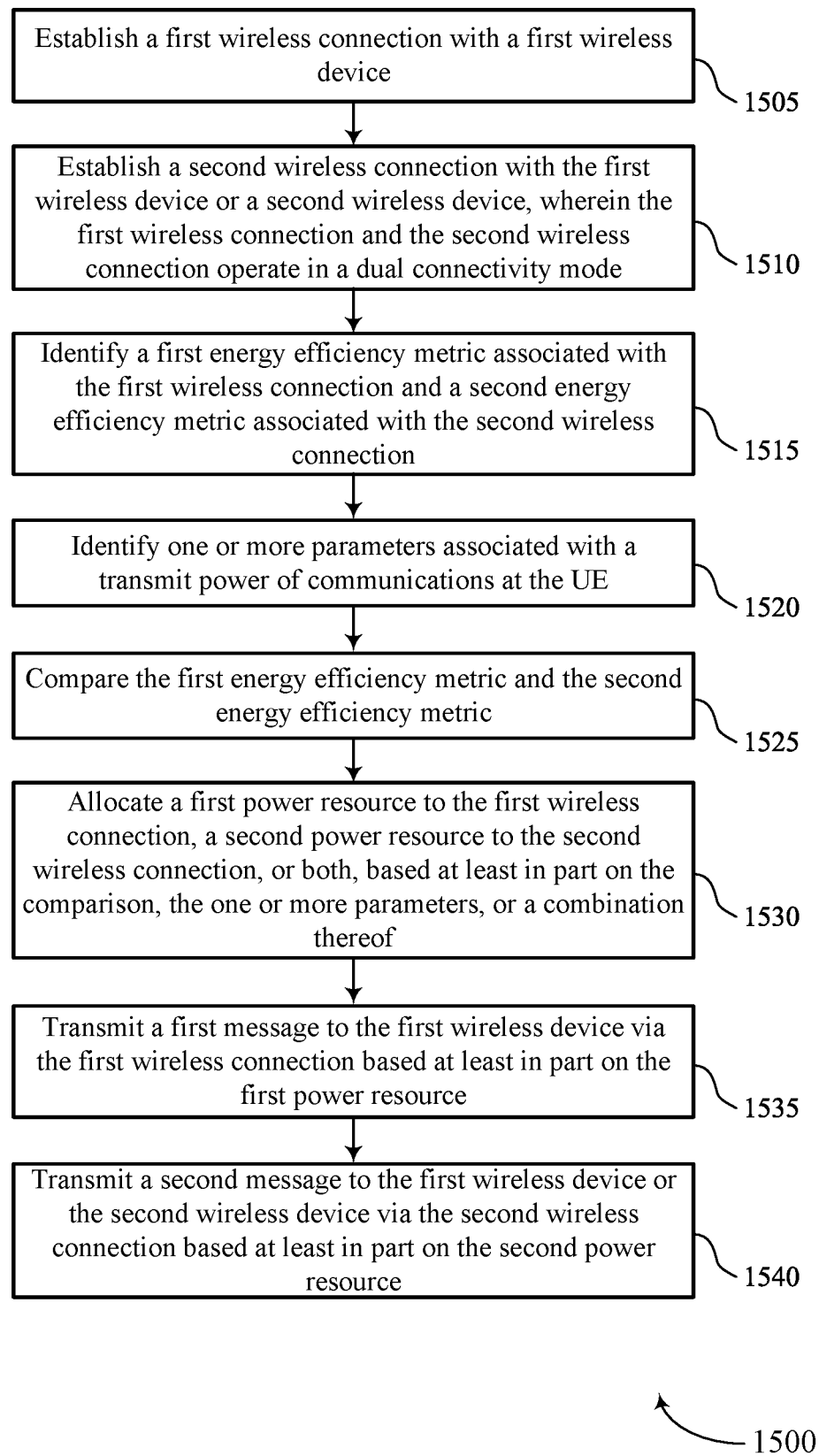

FIG. 15 shows a flowchart illustrating a method 1500 that supports techniques for transmit power allocation in dual connectivity in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include establishing a first wireless connection with a first wireless device. The operations of 1505 may be performed in accordance with examples as disclosed herein. In some examples, aspects of the operations of 1505 may be performed by a wireless connection manager 825 as described with reference to FIG. 8.

At 1510, the method may include establishing a second wireless connection with the first wireless device or a second wireless device, where the first wireless connection and the second wireless connection operate in a dual connectivity mode. The operations of 1510 may be performed in accordance with examples as disclosed herein. In some examples, aspects of the operations of 1510 may be performed by a wireless connection manager 825 as described with reference to FIG. 8.

At 1515, the method may include identifying a first energy efficiency metric associated with the first wireless connection and a second energy efficiency metric associated with the second wireless connection. The operations of 1515 may be performed in accordance with examples as disclosed herein. In some examples, aspects of the operations of 1515 may be performed by an energy efficiency manager 830 as described with reference to FIG. 8.

At 1520, the method may include identifying one or more parameters associated with a transmit power of communications at the UE. The operations of 1520 may be performed in accordance with examples as disclosed herein. In some examples, aspects of the operations of 1520 may be performed by a power resource manager 835 as described with reference to FIG. 8.

At 1525, the method may include comparing the first energy efficiency metric and the second energy efficiency metric. The operations of 1525 may be performed in accordance with examples as disclosed herein. In some examples, aspects of the operations of 1525 may be performed by an energy efficiency manager 830 as described with reference to FIG. 8.

At 1530, the method may include allocating a first power resource to the first wireless connection, a second power resource to the second wireless connection, or both, based on the comparison, the one or more parameters, or a combination thereof. The operations of 1530 may be performed in accordance with examples as disclosed herein. In some examples, aspects of the operations of 1530 may be performed by a power resource manager 835 as described with reference to FIG. 8.

At 1535, the method may include transmitting a first message to the first wireless device via the first wireless connection based on the first power resource. The operations of 1535 may be performed in accordance with examples as disclosed herein. In some examples, aspects of the operations of 1535 may be performed by a message transmitting manager 840 as described with reference to FIG. 8.

At 1540, the method may include transmitting a second message to the first wireless device or the second wireless device via the second wireless connection based on the second power resource. The operations of 1540 may be performed in accordance with examples as disclosed herein. In some examples, aspects of the operations of 1540 may be performed by a message transmitting manager 840 as described with reference to FIG. 8.

Figure 16:
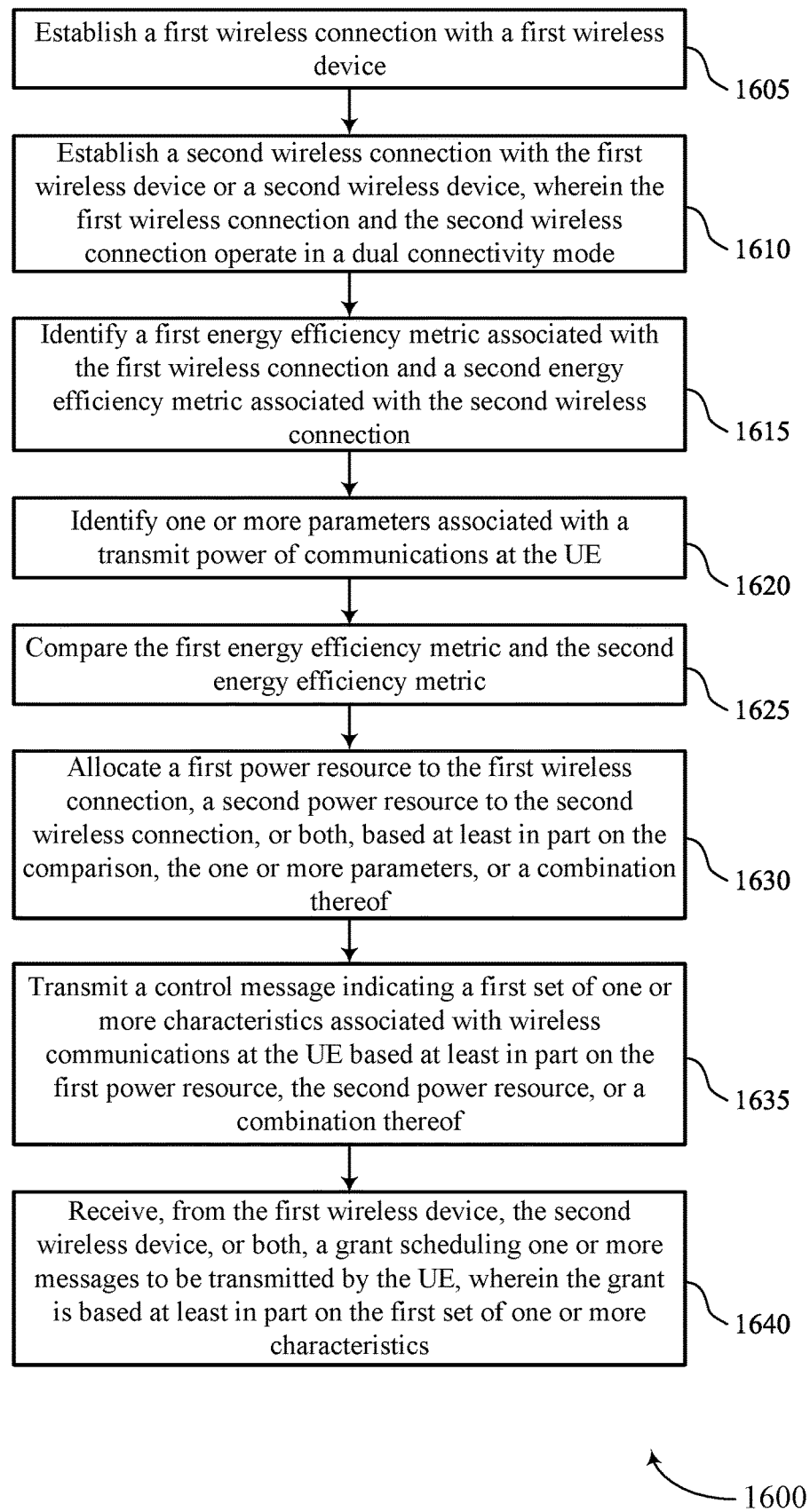

FIG. 16 shows a flowchart illustrating a method 1600 that supports techniques for transmit power allocation in dual connectivity in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include establishing a first wireless connection with a first wireless device. The operations of 1605 may be performed in accordance with examples as disclosed herein. In some examples, aspects of the operations of 1605 may be performed by a wireless connection manager 825 as described with reference to FIG. 8.

At 1610, the method may include establishing a second wireless connection with the first wireless device or a second wireless device, where the first wireless connection and the second wireless connection operate in a dual connectivity mode. The operations of 1610 may be performed in accordance with examples as disclosed herein. In some examples, aspects of the operations of 1610 may be performed by a wireless connection manager 825 as described with reference to FIG. 8.

At 1615, the method may include identifying a first energy efficiency metric associated with the first wireless connection and a second energy efficiency metric associated with the second wireless connection. The operations of 1615 may be performed in accordance with examples as disclosed herein. In some examples, aspects of the operations of 1615 may be performed by an energy efficiency manager 830 as described with reference to FIG. 8.

At 1620, the method may include identifying one or more parameters associated with a transmit power of communications at the UE. The operations of 1620 may be performed in accordance with examples as disclosed herein. In some examples, aspects of the operations of 1620 may be performed by a power resource manager 835 as described with reference to FIG. 8.

At 1625, the method may include comparing the first energy efficiency metric and the second energy efficiency metric. The operations of 1625 may be performed in accordance with examples as disclosed herein. In some examples, aspects of the operations of 1625 may be performed by an energy efficiency manager 830 as described with reference to FIG. 8.

At 1630, the method may include allocating a first power resource to the first wireless connection, a second power resource to the second wireless connection, or both, based on the comparison, the one or more parameters, or a combination thereof. The operations of 1630 may be performed in accordance with examples as disclosed herein. In some examples, aspects of the operations of 1630 may be performed by a power resource manager 835 as described with reference to FIG. 8.

At 1635, the method may include transmitting a control message indicating a first set of one or more characteristics associated with wireless communications at the UE based on the first power resource, the second power resource, or a combination thereof. The operations of 1635 may be performed in accordance with examples as disclosed herein. In some examples, aspects of the operations of 1635 may be performed by a control message transmitting manager 845 as described with reference to FIG. 8.

At 1640, the method may include receiving, from the first wireless device, the second wireless device, or both, a grant scheduling one or more messages to be transmitted by the UE, where the grant is based on the first set of one or more characteristics. The operations of 1640 may be performed in accordance with examples as disclosed herein. In some examples, aspects of the operations of 1640 may be performed by a grant receiving manager 850 as described with reference to FIG. 8.

Figure 17:
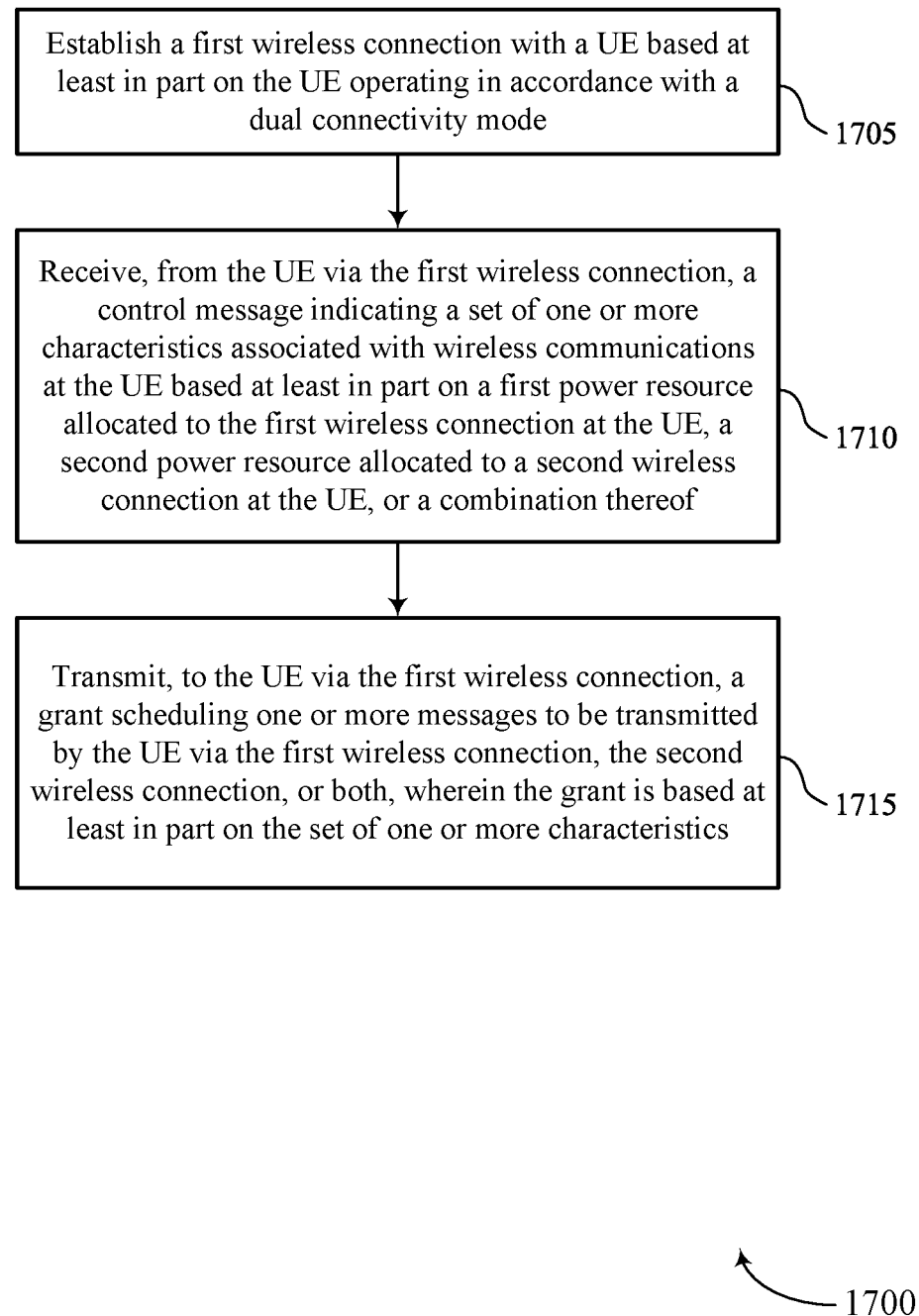

FIG. 17 shows a flowchart illustrating a method 1700 that supports techniques for transmit power allocation in dual connectivity in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include establishing a first wireless connection with a UE based on the UE operating in accordance with a dual connectivity mode. The operations of 1705 may be performed in accordance with examples as disclosed herein. In some examples, aspects of the operations of 1705 may be performed by a wireless connection manager 1225 as described with reference to FIG. 12.

At 1710, the method may include receiving, from the UE via the first wireless connection, a control message indicating a set of one or more characteristics associated with wireless communications at the UE based on a first power resource allocated to the first wireless connection at the UE, a second power resource allocated to a second wireless connection at the UE, or a combination thereof. The operations of 1710 may be performed in accordance with examples as disclosed herein. In some examples, aspects of the operations of 1710 may be performed by a control message receiving manager 1230 as described with reference to FIG. 12.

At 1715, the method may include transmitting, to the UE via the first wireless connection, a grant scheduling one or more messages to be transmitted by the UE via the first wireless connection, the second wireless connection, or both, where the grant is based on the set of one or more characteristics. The operations of 1715 may be performed in accordance with examples as disclosed herein. In some examples, aspects of the operations of 1715 may be performed by a grant transmitting manager 1235 as described with reference to FIG. 12.

The following provides an overview of aspects of the present disclosure:

Aspect 1: A method for wireless communication at a UE, comprising: establishing a first wireless connection with a first wireless device; establishing a second wireless connection with the first wireless device or a second wireless device, wherein the first wireless connection and the second wireless connection operate in a dual connectivity mode; identifying a first energy efficiency metric associated with the first wireless connection and a second energy efficiency metric associated with the second wireless connection; identifying one or more parameters associated with a transmit power of communications at the UE; comparing the first energy efficiency metric and the second energy efficiency metric; and allocating a first power resource to the first wireless connection, a second power resource to the second wireless connection, or both, based at least in part on the comparison, the one or more parameters, or a combination thereof.

Aspect 2: The method of aspect 1, further comprising: transmitting a first message to the first wireless device via the first wireless connection based at least in part on the first power resource; and transmitting a second message to the first wireless device or the second wireless device via the second wireless connection based at least in part on the second power resource.

Aspect 3: The method of any of aspects 1 through 2, further comprising: transmitting a control message indicating a first set of one or more characteristics associated with wireless communications at the UE based at least in part on the first power resource, the second power resource, or a combination thereof.

Aspect 4: The method of aspect 3, further comprising: identifying an available PHR, a message buffer queue, or both, associated with the UE based at least in part on the first power resource, the second power resource, the one or more parameters, or any combination thereof selectively adjusting at least one of the available PHR or the message buffer queue to generate an adjusted available PHR, an adjusted message buffer queue, or both, wherein the first set of one or more characteristics comprise the adjusted available PHR, the adjusted message buffer queue, or both.

Aspect 5: The method of any of aspects 3 through 4, further comprising: transmitting, via the control message, an indication of a first message buffer queue associated with the first wireless connection and a second message buffer queue associated with the second wireless connection, the second message buffer queue different from the first message buffer queue.

Aspect 6: The method of aspect 5, wherein the larger of the first message buffer queue and the second message buffer queue is associated with a wireless connection from the first wireless connection and the second wireless connection which is associated with the higher energy efficiency metric of the first energy efficiency metric and the second energy efficiency metric.

Aspect 7: The method of any of aspects 1 through 6, wherein allocating the first power resource and the second power resource comprises: allocating the first power resource and the second power resource based at least in part on an aggregate data throughput associated with the first wireless connection and the second wireless connection satisfying a threshold data throughput.

Aspect 8: The method of any of aspects 1 through 7, wherein allocating the first power resource and the second power resource comprises: allocating the first power resource and the second power resource based at least in part on an absence of voice traffic at the UE, or whether voice traffic at the UE is communicated via the first wireless connection, the second wireless connection, or a combination thereof.

Aspect 9: The method of aspect 8, wherein voice traffic at the UE is communicated via the first wireless connection, wherein allocating the first power resource and the second power resource comprises: allocating the first power resource and the second power resource based at least in part on whether the first wireless connection is associated with a default radio bearer.

Aspect 10: The method of any of aspects 1 through 9, wherein allocating the first power resource and the second power resource comprises: allocating the first power resource and the second power resource is based at least in part on whether internet traffic at the UE is communicated via the first wireless connection, the second wireless connection, or both.

Aspect 11: The method of any of aspects 1 through 10, wherein allocating the first power resource and the second power resource comprises: allocating the first power resource and the second power resource is based at least in part on a configuration of a first DRB associated with the first wireless connection, a second DRB associated with the second wireless connection, or both.

Aspect 12: The method of aspect 11, wherein the configuration of the first DRB, the second DRB, or both, comprises a split radio bearer configuration, a non-split radio bearer configuration, or both.

Aspect 13: The method of any of aspects 1 through 12, further comprising: identifying a first MCS associated with the first wireless connection and a second MCS associated with the second wireless connection, wherein identifying the first energy efficiency metric and the second energy efficiency metric is based at least in part on the first MCS, the second MCS, or a combination thereof.

Aspect 14: The method of any of aspects 1 through 13, further comprising: performing a first set of measurements on a first message received via the first wireless connection; and performing a second set of measurements on a second message received via the second wireless connection, wherein identifying the first energy efficiency metric and the second energy efficiency metric is based at least in part on the first set of measurements, the second set of measurements, or a combination thereof.

Aspect 15: The method of any of aspects 1 through 14, further comprising: receiving a first measurement report associated with communications performed via the first wireless connection; and receiving a second measurement report associated with communications performed via the second wireless connection, wherein identifying the first energy efficiency metric and the second energy efficiency metric is based at least in part on the first measurement report, the second measurement report, or a combination thereof.

Aspect 16: The method of any of aspects 1 through 15, wherein the one or more parameters comprise a SAR, a MPE, or both.

Aspect 17: The method of any of aspects 1 through 16, wherein the first wireless connection comprises a wireless connection for a MCG, and the second wireless connection comprises a wireless connection for a SCG.

Aspect 18: The method of any of aspects 1 through 17, wherein. the first wireless connection and the second wireless connection are associated with a same radio access technology, or the first wireless connection is associated with a first radio access technology, and the second wireless connection is associated with a second radio access technology different from the first radio access technology Aspect 19: The method of any of aspects 1 through 18, wherein allocating the first transmit power and the second transmit power comprises: allocating the first power resource based at least in part on a first minimum power resource threshold and a first maximum power resource threshold associated with the first wireless connection; and allocating the second power resource based at least in part on a second minimum power resource threshold and a second maximum power resource threshold associated with the second wireless connection.

Aspect 20: The method of any of aspects 1 through 19, wherein the first power resource, the second power resource, or both, comprises an instantaneous transmit power, a transmit power over a time interval, or both.

Aspect 21: A method for wireless communication at a base station, comprising: establishing a first wireless connection with a UE based at least in part on the UE operating in accordance with a dual connectivity mode; receiving, from the UE via the first wireless connection, a control message indicating a set of one or more characteristics associated with wireless communications at the UE based at least in part on a first power resource allocated to the first wireless connection at the UE, a second power resource allocated to a second wireless connection at the UE, or a combination thereof; and transmitting, to the UE via the first wireless connection, a grant scheduling one or more messages to be transmitted by the UE via the first wireless connection, the second wireless connection, or both, wherein the grant is based at least in part on the set of one or more characteristics.

Aspect 22: The method of aspect 21, further comprising: establishing the second wireless connection with the UE, wherein the first wireless connection and the second wireless connection operate in the dual connectivity mode at the UE; receiving, a first message from the UE via the first wireless connection based at least in part on the grant and the first power resource; and receiving a second message from the UE via the second wireless connection based at least in part on the grant and the second power resource.

Aspect 23: An apparatus for wireless communication at a UE, comprising a processor; memory coupled with the processor; and instructions stored in the memory and executable by the processor to cause the apparatus to perform a method of any of aspects 1 through 20.

Aspect 24: An apparatus for wireless communication at a UE, comprising at least one means for performing a method of any of aspects 1 through 20.

Aspect 25: A non-transitory computer-readable medium storing code for wireless communication at a UE, the code comprising instructions executable by a processor to perform a method of any of aspects 1 through 20.

Aspect 26: An apparatus for wireless communication at a base station, comprising a processor; memory coupled with the processor; and instructions stored in the memory and executable by the processor to cause the apparatus to perform a method of any of aspects 21 through 22.

Aspect 27: An apparatus for wireless communication at a base station, comprising at least one means for performing a method of any of aspects 21 through 22.

Aspect 28: A non-transitory computer-readable medium storing code for wireless communication at a base station, the code comprising instructions executable by a processor to perform a method of any of aspects 21 through 22.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   establishing a first wireless connection with a first wireless device;
   establishing a second wireless connection with the first wireless device or a second wireless device, wherein the first wireless connection and the second wireless connection operate in a dual connectivity mode;
   identifying a first energy efficiency metric associated with the first wireless connection and a second energy efficiency metric associated with the second wireless connection;
   identifying one or more parameters associated with a transmit power of communications at the UE;
   comparing the first energy efficiency metric and the second energy efficiency metric;
   allocating a first power resource to the first wireless connection, a second power resource to the second wireless connection, or both, based at least in part on the comparison, the one or more parameters, or a combination thereof; and
   transmitting a control message indicating a first set of one or more characteristics associated with wireless communications at the UE based at least in part on the first power resource, the second power resource, or a combination thereof, the control message further indicating a first message buffer queue associated with the first wireless connection and a second message buffer queue associated with the second wireless connection, the second message buffer queue different from the first message buffer queue.

2. The method of claim 1, further comprising:
   transmitting a first message to the first wireless device via the first wireless connection based at least in part on the first power resource; and
   transmitting a second message to the first wireless device or the second wireless device via the second wireless connection based at least in part on the second power resource.

3. The method of claim 1, further comprising:
   identifying an available power headroom, a message buffer queue, or both, associated with the UE based at least in part on the first power resource, the second power resource, the one or more parameters, or any combination thereof;
   selectively adjusting at least one of the available power headroom or the message buffer queue to generate an adjusted available power headroom, an adjusted message buffer queue, or both, wherein the first set of one or more characteristics comprise the adjusted available power headroom, the adjusted message buffer queue, or both.

4. The method of claim 1, wherein the larger of the first message buffer queue and the second message buffer queue is associated with a wireless connection from the first wireless connection and the second wireless connection which is associated with the higher energy efficiency metric of the first energy efficiency metric and the second energy efficiency metric.

5. The method of claim 1, further comprising:
   performing a first set of measurements on a first message received via the first wireless connection; and
   performing a second set of measurements on a second message received via the second wireless connection, wherein identifying the first energy efficiency metric and the second energy efficiency metric is based at least in part on the first set of measurements, the second set of measurements, or a combination thereof.

6. The method of claim 1, further comprising:
   receiving a first measurement report associated with communications performed via the first wireless connection; and
   receiving a second measurement report associated with communications performed via the second wireless connection, wherein identifying the first energy efficiency metric and the second energy efficiency metric is based at least in part on the first measurement report, the second measurement report, or a combination thereof.

7. The method of claim 1, wherein the one or more parameters comprise a specific absorption rate, a maximum permissible exposure, or both.

8. The method of claim 1, wherein the first wireless connection comprises a wireless connection for a master cell group, and wherein the second wireless connection comprises a wireless connection for a secondary cell group.

9. The method of claim 1, wherein:
   the first wireless connection and the second wireless connection are associated with a same radio access technology, or
   the first wireless connection is associated with a first radio access technology, and the second wireless connection is associated with a second radio access technology different from the first radio access technology.

10. The method of claim 1, wherein the first power resource, the second power resource, or both, comprises an instantaneous transmit power, a transmit power over a time interval, or both.

11. A method for wireless communication at a user equipment (UE), comprising:
- establishing a first wireless connection with a first wireless device;
- establishing a second wireless connection with the first wireless device or a second wireless device, wherein the first wireless connection and the second wireless connection operate in a dual connectivity mode;
- identifying a first energy efficiency metric associated with the first wireless connection and a second energy efficiency metric associated with the second wireless connection;
- identifying one or more parameters associated with a transmit power of communications at the UE;
- comparing the first energy efficiency metric and the second energy efficiency metric; and
- allocating a first power resource to the first wireless connection and a second power resource to the second wireless connection based at least in part on an absence of voice traffic at the UE, or whether voice traffic at the UE is communicated via the first wireless connection, the second wireless connection, or a combination thereof.

12. The method of claim 11, wherein allocating the first power resource and the second power resource comprises:
- allocating the first power resource and the second power resource based at least in part on an aggregate data throughput associated with the first wireless connection and the second wireless connection satisfying a threshold data throughput.

13. The method of claim 11, wherein voice traffic at the UE is communicated via the first wireless connection, wherein allocating the first power resource and the second power resource comprises:
- allocating the first power resource and the second power resource based at least in part on whether the first wireless connection is associated with a default radio bearer.

14. The method of claim 11, wherein allocating the first power resource and the second power resource comprises:
- allocating the first power resource and the second power resource based at least in part on whether internet traffic at the UE is communicated via the first wireless connection, the second wireless connection, or both.

15. The method of claim 11, wherein allocating the first power resource and the second power resource comprises:
- allocating the first power resource and the second power resource based at least in part on a configuration of a first data radio bearer associated with the first wireless connection, a second data radio bearer associated with the second wireless connection, or both.

16. The method of claim 15, wherein the configuration of the first data radio bearer, the second data radio bearer, or both, comprises a split radio bearer configuration, a non-split radio bearer configuration, or both.

17. The method of claim 11, further comprising:
- identifying a first modulation and coding scheme associated with the first wireless connection and a second modulation and coding scheme associated with the second wireless connection, wherein identifying the first energy efficiency metric and the second energy efficiency metric is based at least in part on the first modulation and coding scheme, the second modulation and coding scheme, or a combination thereof.

18. The method of claim 11, wherein allocating the first transmit power and the second transmit power comprises:
- allocating the first power resource based at least in part on a first minimum power resource threshold and a first maximum power resource threshold associated with the first wireless connection; and
- allocating the second power resource based at least in part on a second minimum power resource threshold and a second maximum power resource threshold associated with the second wireless connection.

19. An apparatus for wireless communication at a user equipment (UE), comprising:
- a processor;
- memory coupled with the processor; and
- instructions stored in the memory and executable by the processor to cause the apparatus to:
  - establish a first wireless connection with a first wireless device;
  - establish a second wireless connection with the first wireless device or a second wireless device, wherein the first wireless connection and the second wireless connection operate in a dual connectivity mode;
  - identify a first energy efficiency metric associated with the first wireless connection and a second energy efficiency metric associated with the second wireless connection;
  - identify one or more parameters associated with a transmit power of communications at the UE;
  - compare the first energy efficiency metric and the second energy efficiency metric;
  - allocate a first power resource to the first wireless connection, a second power resource to the second wireless connection, or both, based at least in part on the comparison, the one or more parameters, or a combination thereof; and
  - transmit a control message indicating a first set of one or more characteristics associated with wireless communications at the UE based at least in part on the first power resource, the second power resource, or a combination thereof, the control message further indicating a first message buffer queue associated with the first wireless connection and a second message buffer queue associated with the second wireless connection, the second message buffer queue different from the first message buffer queue.

20. The apparatus of claim 19, wherein the instructions are further executable by the processor to cause the apparatus to:
- transmit a first message to the first wireless device via the first wireless connection based at least in part on the first power resource; and
- transmit a second message to the first wireless device or the second wireless device via the second wireless connection based at least in part on the second power resource.

21. The apparatus of claim 19, wherein the instructions are further executable by the processor to cause the apparatus to:
- receive, from the first wireless device, the second wireless device, or both, a grant scheduling one or more messages to be transmitted by the UE, wherein the grant is based at least in part on the first set of one or more characteristics.

22. The apparatus of claim 19, wherein the instructions are further executable by the processor to cause the apparatus to:
- identify an available power headroom, a message buffer queue, or both, associated with the UE based at least in part on the first power resource, the second power resource, the one or more parameters, or any combination thereof;

selectively adjust at least one of the available power headroom or the message buffer queue to generate an adjusted available power headroom, an adjusted message buffer queue, or both, wherein the first set of one or more characteristics comprise the adjusted available power headroom, the adjusted message buffer queue, or both.

23. An apparatus for wireless communication at a user equipment (UE), comprising:

a processor;

memory coupled with the processor; and instructions stored in the memory and executable by the processor to cause the apparatus to:

establish a first wireless connection with a first wireless device;

establish a second wireless connection with the first wireless device or a second wireless device, wherein the first wireless connection and the second wireless connection operate in a dual connectivity mode;

identify a first energy efficiency metric associated with the first wireless connection and a second energy efficiency metric associated with the second wireless connection;

identify one or more parameters associated with a transmit power of communications at the UE;

compare the first energy efficiency metric and the second energy efficiency metric; and allocate a first power resource to the first wireless connection and a second power resource to the second wireless connection based at least in part on an absence of voice traffic at the UE, or whether voice traffic at the UE is communicated via the first wireless connection, the second wireless connection, or a combination thereof.

24. The apparatus of claim 23, wherein the instructions to allocate the first power resource and the second power resource are executable by the processor to cause the apparatus to:

allocate the first power resource and the second power resource based at least in part on an aggregate data throughput associated with the first wireless connection and the second wireless connection satisfying a threshold data throughput.

\* \* \* \* \*